US012777438B2

(12) United States Patent
Guignard et al.

(10) Patent No.: US 12,777,438 B2
(45) Date of Patent: Oct. 27, 2026

(54) CONTROLLING TIME SYNCHRONISATION IN A WIRELESS NETWORK

(71) Applicant: CANON KABUSHIKI KAISHA, Tokyo (JP)

(72) Inventors: Romain Guignard, Rennes (FR); Yacine El Kolli, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 18/559,007

(22) PCT Filed: May 4, 2022

(86) PCT No.: PCT/EP2022/061926
§ 371 (c)(1),
(2) Date: Nov. 3, 2023

(87) PCT Pub. No.: WO2022/233912
PCT Pub. Date: Nov. 10, 2022

(65) Prior Publication Data

US 2024/0236892 A1 Jul. 11, 2024

(30) Foreign Application Priority Data

May 4, 2021 (GB) ...................................... 2106370
Jun. 30, 2021 (GB) ...................................... 2109415

(51) Int. Cl.
*H04W 56/00* (2009.01)
*H04W 76/20* (2018.01)

(52) U.S. Cl.
CPC ... *H04W 56/0015* (2013.01); *H04W 56/0045* (2013.01); *H04W 76/20* (2018.02)

(58) Field of Classification Search
CPC ......... H04W 56/0015; H04W 56/0045; H04W 76/20
See application file for complete search history.

(56) References Cited

U.S. PATENT DOCUMENTS 11,019,583 B2 * 5/2021 Laselva ................. H04W 72/21
2020/0322908 A1 10/2020 Prakash et al.
(Continued)

FOREIGN PATENT DOCUMENTS

CN 111565083 A 8/2020
CN 112567829 A 3/2021
(Continued)

OTHER PUBLICATIONS

Nokia; "Remaining issues for accurate reference time delivery"; 3PP Draft; R2-1915691; Nov. 8, 2019.
(Continued)

*Primary Examiner* — Kenny S Lin
(74) *Attorney, Agent, or Firm* — Canon U.S.A., Inc. IP Division

(57) ABSTRACT

A method for controlling time synchronisation in a wireless network comprising a user equipment, UE, and a base station, is disclosed. The method, at the UE, comprises: determining time synchronisation requirements between the UE and the base station; generating a time synchronization control message for controlling a time synchronisation process between the UE and the base station based on the determined time synchronisation requirements; and sending the time synchronization control message to the base station. A similar method may be performed at the base station with the base station sending the time synchronization control message to the UE.

22 Claims, 19 Drawing Sheets

(56) References Cited

U.S. PATENT DOCUMENTS

| | | | | |
|---|---|---|---|---|
| 2021/0099341 | A1* | 4/2021 | Moon | H04W 76/10 |
| 2022/0070808 | A1* | 3/2022 | Jacobsen | H04W 56/0035 |
| 2023/0134036 | A1* | 5/2023 | Larsson | H04W 56/0055 370/350 |
| 2024/0121736 | A1* | 4/2024 | Min | H04W 24/10 |

FOREIGN PATENT DOCUMENTS

| | | | | | |
|---|---|---|---|---|---|
| CN | 112713953 | A | | 4/2021 | |
| EP | 4087335 | A1 | * | 11/2022 | H04W 56/0015 |
| EP | 4213416 | A1 | * | 7/2023 | H04W 56/004 |
| TW | 202123728 | A | * | 6/2021 | H04W 56/0065 |
| WO | 2012068845 | A1 | | 5/2012 | |
| WO | 2014075260 | A1 | | 5/2014 | |
| WO | 2020167013 | A1 | | 8/2020 | |
| WO | 2021023156 | A1 | | 2/2021 | |
| WO | 2021066732 | A1 | | 4/2021 | |
| WO | WO-2021056295 | A1 | * | 4/2021 | H04W 56/00 |

OTHER PUBLICATIONS

Nokia, Nokia Shanghai Bell; "Discussion on enhancements for support of propagation delay compensation for accurate time synchronization"; R2-2006922; 3GPP Draft; R2-2006922; Aug. 6, 2020.

NTTDOCOMO; "Discussion on uplink time synchronization for TSN"; 3GPP Draft; R2-2010532; Oct. 23, 2020.

Nokia; "Exposure of Time synchronization as a service"; 3GPP Draft; S2-2102359; Apr. 6, 2021.

3GPP Standard; "3rd Generation Partnership Project; Technical Specification Group Services and System Aspects; Study on enhanced support of Industrial Internet of Things (IIoT) in the 5G System (5GS) (Release 17)"; XP051999993; Mar. 14, 2021; pp. 1-88.

Qualcomm Incorporated; "Propagation Delay Compensation for TSN"; 3GPP Draft; R2-2100267; XP051973467; Jan. 15, 2021.

Huawei, Hi Silicon; "Discussion on the time synchronisation enhancements"; R2-2100215; 3GPP.

Author Unknown, 3GPP TSG-RAN WG2 Meeting #111 E-meeting, R2-2006831, Enhancements for time synchronization in TSN, Aug. 17-28, 2020, pp. 1-10.

Author Unknown, 3GPP TSG-RAN WG2 Meeting #113 e-meeting, R2-2100327, Further considerations on time synchronization and PDC, Jan. 25-Feb. 5, 2021, pp. 1-7.

Author Unknown, 3GPP TSG-RAN WG2 #113-e, R2-2102071, Summary on Enhancements for support of time synchronization (8.5.2), Jan. 25-Feb. 5, 2021, pp. 1-8.

* cited by examiner

| Bit 1 | | | | | | | Bit 8 | |
|---|---|---|---|---|---|---|---|---|
| R | R | LCID | | | | | | Byte 1 |
| R | R | R | R | R | R | PDC ON/OFF | Time sync. ON/OFF | Byte 2 |

Figure 11

CONTROLLING TIME SYNCHRONISATION IN A WIRELESS NETWORK

CROSS-REFERENCE TO RELATED APPLICATIONS

The application is the National Phase application of PCT Application No. PCT/EP2022/061926, filed on May 4, 2022 and titled "Controlling Time Synchronisation in a Wireless Network". This application claims the benefit under 35 U.S.C. § 119(a)-(d) of United Kingdom Patent Application No. 2106370.6, filed on May 4, 2021 and titled "Controlling Time Synchronisation in a Wireless Network" and United Kingdom Patent Application No. 2109415.6, filed on Jun. 30, 2021 and titled "Controlling Time Synchronisation in a Wireless Network". Each of the above cited patent applications are incorporated herein by reference in its entirety.

FIELD OF THE INVENTION

The present invention generally relates to controlling time synchronisation in a wireless network. In particular, the invention relates to controlling time synchronisation between User Equipment, UE, and a base station in a Radio Access Network (RAN) of the wireless network.

BACKGROUND

The uses of the Internet of Things, IoT, are multiplying. Each use is accompanied by particular constraints.

One use of IoT is in industry, for example, in production plants using critical machines and a plurality of sensors and actuators, power plants, and the like. IoT or Industrial IoT (IIoT) makes it possible, for example, to precisely track a production line by implementing the following functions (non-exhaustive list): predictive maintenance (avoiding production interruptions by identifying early warning signs of failures to proactively schedule maintenance intervention), intelligent diagnostics (by recording operational data and repair history through sensors), production line optimisation, production machines optimisation, etc.

With the development of 5G technology, a new generation of IoT is developing which uses 5G as the access network. However, it is still necessary to ensure that 5G network is compatible with time sensitive applications implemented by IoT elements.

To do that, an accurate time synchronisation is required within the 5G network. A challenging part for time synchronization in the 5G system is to ensure synchronization in the wireless part (Radio Access Network (RAN)) of the 5G system which implies resource sharing and random time to access the medium. The time synchronization process in RAN is based on the sending of a reference time by the base station (for example, referred to as gNB in 5G) to the User Equipment (UE) in order to share a common time in between all nodes in a same cell. Moreover, to improve the accuracy of the time synchronization, a path delay compensation may be performed. This path delay compensation tries to compensate the effect of the signal propagation between the UE and the base station. As the path delay is related to the UE-gNB distance, it is consequently different for each UE. The path delay compensation requires to compute the path delay between a UE and its associated gNB. The computation of path delay may be performed according to different methods (e.g. Timing advance, RTT based) and is usually executed by the gNB. Then, the obtained path delay value is applied to the reference time to compensate the path delay effect. This extra feature is only mandatory for specific scenario with severe delay requirement. For example, the 3GPP consortium (RAN2 group) has agreed the synchronicity budget for wireless interface (Uu) where the UE-UE synchronicity budget could be from ±145 ns to ±275 ns in the control-to-control scenario (machine to machine) and from ±795 ns to ±845 ns in the power grid scenario. In addition, when the distance between UE and base station is short (e.g. less than 30 metres), the error introduced by the path delay may be considered as negligible. It has been discussed that the path delay compensation is not mandatory in each situation (e.g. path or propagation delay compensation is needed to support an indoor factory scenario but may not be necessary for a power grid scenario). For example, a 3GPP document R2-2006922 from Nokia suggests that the gNB (base station) should be able to enable and disable path delay compensation but provides few details as to how this can be achieved.

Although the time synchronization process based on the sending of a reference time by the base station helps to ensure synchronization in the wireless part of the 5G system, it has a cost in terms of additional message exchange i.e. periodic sending of the reference time from the base station to the UEs and dedicated signals to estimate and convey the path delay, and in terms of additional processing for each node involved in the time synchronization process.

Consequently, it is desirable to provide an improved time synchronization process or service between a UE and the base station (e.g. in the RAN).

SUMMARY

In accordance with a first aspect of the present invention, there is provided a method for controlling time synchronisation in a wireless network comprising a user equipment, UE, and a base station, the method, at the base station, comprising: determining time synchronisation requirements between the UE and the base station; providing a time synchronization control message for controlling a time synchronisation process between the UE and the base station based on the determined time synchronisation requirements; and sending the time synchronization control message to the UE, wherein the time synchronisation control message includes information for controlling the time synchronisation process with a particular type of propagation delay compensation, PDC, and wherein the time synchronisation control message includes a field for indicating the particular type of PDC, among a plurality of types of PDC, for the time synchronisation process.

In accordance with a second aspect of the present invention, there is provided a method for controlling time synchronisation in a wireless network comprising a user equipment, UE, and a base station, the method, at the UE, comprising: receiving, from the base station, a time synchronization control message; and controlling a time synchronisation process based on the received time synchronization control message, wherein the time synchronisation control message includes information for controlling the time synchronisation process with a particular type of propagation delay compensation, PDC, and wherein the time synchronisation control message includes a field for indicating the particular type of PDC, among a plurality of types of PDC, for the time synchronisation process.

In accordance with an example, there is provided a method for controlling time synchronisation in a wireless network comprising a user equipment, UE, and a base station, the method, at the UE, comprising:

determining time synchronisation requirements between the UE and the base station;

generating a time synchronization control message for controlling a time synchronisation process between the UE and the base station based on the determined time synchronisation requirements; and sending the time synchronization control message to the base station.

In accordance with an example, there is provided a method for controlling time synchronisation in a wireless network comprising a user equipment, UE, and a base station, the method, at the base station, comprising:

receiving, from the UE, a time synchronization control message;

controlling a time synchronisation process based on the received time synchronization control message, wherein controlling the time synchronisation process comprises:

activating the time synchronisation process at the base station; or deactivating the time synchronisation process at the base station; or changing the time synchronisation process at the base station by activating or deactivating path delay compensation.

In accordance with a third aspect of the present invention, there is provided an apparatus for a User Equipment, UE, for controlling time synchronisation between the UE and a base station of a wireless network, the apparatus comprising: one or more processing units configured to: receive, from the base station, a time synchronization control message; and control a time synchronisation process based on the received time synchronization control message, wherein the time synchronisation control message includes information for controlling the time synchronisation process with a particular type of propagation delay compensation, PDC, and wherein the time synchronisation control message includes a field for indicating the particular type of PDC, among a plurality of types of PDC, for the time synchronisation process.

In accordance with a fourth aspect of the present invention, there is provided an apparatus for a base station for controlling time synchronisation between a UE and the base station of a wireless network, the apparatus comprising: one or more processing units configured to: determine time synchronisation requirements between the UE and the base station; provide a time synchronization control message for controlling a time synchronisation process between the UE and the base station based on the determined time synchronisation requirements; and send the time synchronization control message to the UE, wherein the time synchronisation control message includes information for controlling the time synchronisation process with a particular type of propagation delay compensation, PDC, and wherein the time synchronisation control message includes a field for indicating the particular type of PDC, among a plurality of types of PDC, for the time synchronisation process.

In accordance with a fifth aspect of the present invention, there is provided a time synchronization control message for controlling time synchronisation between a UE and a base station of a wireless network, the time synchronization control message comprising information for controlling the time synchronisation process with a particular type of propagation delay compensation, PDC, wherein the time synchronization control message includes a field for indicating the particular type of PDC, among a plurality of types of PDC, for the time synchronisation process.

One node of the Radio Access Network receives a message which triggers the creation of a time synchronization control message. This time synchronization control message contains a field controlling the activation/deactivation of the time synchronization process. The node sends the message to control the activation/deactivation of the time synchronization process.

Thus, in accordance with the present invention signalling shall allow enabling and disabling the clock synchronization in the RAN (UEs and gNBs) only when needed.

In order to optimise the use of resources in a RAN (e.g. signalling between and processing at an UE and a base station) of a wireless network (such as the 5G network), embodiments of the present invention are arranged to activate time synchronization in the RAN only when needed and to otherwise deactivate time synchronization to reduce the amount of signalling and processing in the RAN. In some examples, Path Delay Compensation (PDC) may also be activated only when required and otherwise deactivated. By only using PDC when required, this can provide an additional reduction in the amount of signalling and processing in the RAN and also avoids issues when the error introduced by PDC may be higher than the error without using PDC.

The claims refer to activating, for example, with respect to time synchronisation and PDC. The description refers to activating and also refers to enabling and starting. It will be appreciated that it is intended that these terms are equivalent and are interchangeable. Similarly, the claims refer to deactivating and the description refers to deactivating and also refers to disabling and stopping. It will be appreciated that it is intended that these terms are equivalent and are interchangeable.

Further features of the invention are characterised by the other independent and dependent claims.

Any feature in one aspect of the invention may be applied to other aspects of the invention, in any appropriate combination. In particular, method aspects may be applied to apparatus/device/unit aspects, and vice versa.

Furthermore, features implemented in hardware may be implemented in software, and vice versa. Any reference to software and hardware features herein should be construed accordingly. For example, in accordance with another aspect of the invention, there is provided a computer readable storage medium storing at least one computer program comprising instructions that, when executed by a processing unit, causes the processing unit to perform the method according to any aspect or example described above.

It should also be appreciated that particular combinations of the various features described and defined in any aspects of the invention can be implemented and/or supplied and/or used independently.

BRIEF DESCRIPTION OF THE DRAWINGS

Different aspects of the invention will now be described, by way of example only, and with reference to the following drawings in which:

FIG. 11 is a schematic diagram illustrating an example MAC CE signaling frame format used as a time synchronization control message according to embodiments of the invention.

DETAILED DESCRIPTION

Figure 1:
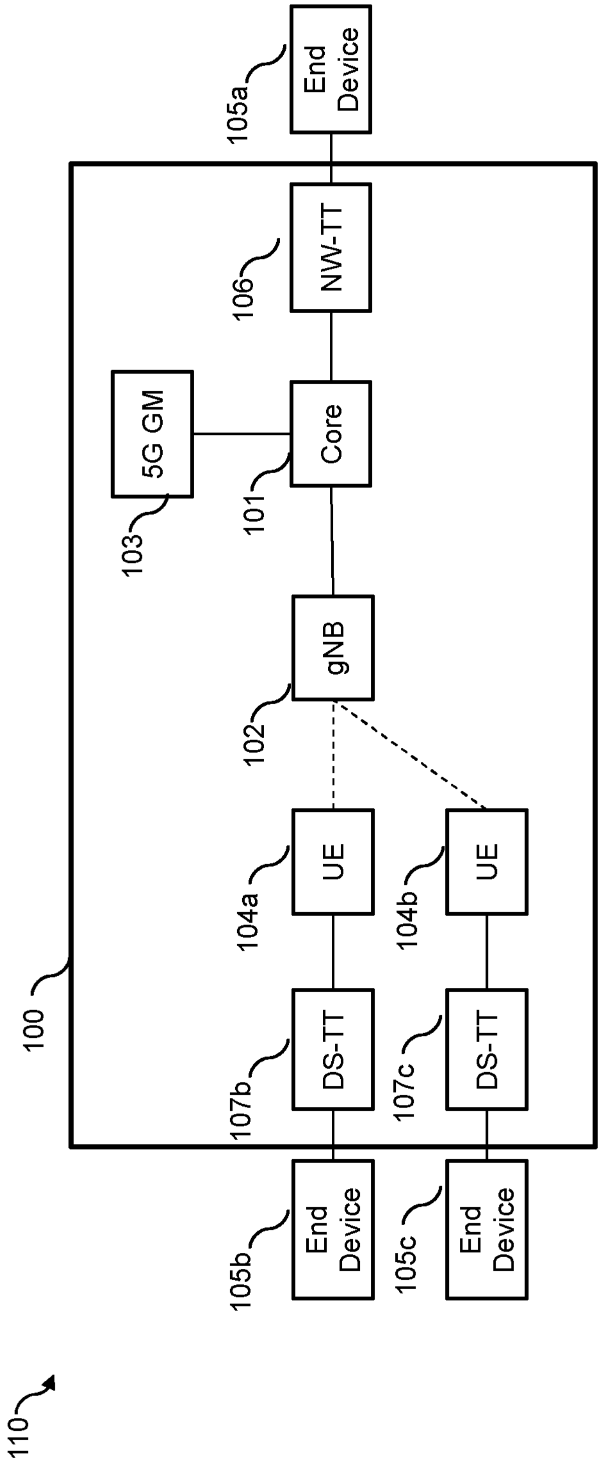
FIG. 1 is a block schematic diagram illustrating an 5G network interconnecting connected end devices.

Embodiments of the present invention are intended to be implemented in a wireless network, such as a fifth-generation (5G) network, used for interconnecting connected objects or terminals or end devices of a communications system 110 such as the one illustrated in FIG. 1.

The 5G network 100 comprises a plurality of user equipment (UE) 104*a*, 104*b*, also called mobile stations, wirelessly connected (as indicated by the dotted lines) to at least one base station 102 (gNB or gNodeB). The gNB 102 is connected to a core network 101, for instance by a wired connection (e.g. using fiber-optic) or wirelessly. The gNB 102 is part of the Radio Access Network of the 5G network 100 and uses radio frequencies to provide wireless connectivity to the UEs 104*a*, 104*b*.

In this 5G network 100, a common time reference is provided by a Grand Master clock (5G GM) 103, and is precisely defined in TS 23.501 clause 5.27.

The 5G GM clock 103 may be connected to the core network 101, as illustrated in FIG. 1, but may be also directly connected to the gNB or to one or more of the UEs 104*a*, 104*b*. Thus, the device connected with the 5G GM clock 103 shares with other devices of the network, the common time reference provided by the 5G GM clock 103.

According to some embodiments, the common time reference provided by the 5G GM clock 103 may be the universal time reference or based on it. In this case, the universal time reference may be obtained by the gNB 102 directly from a satellite system (not shown in FIG. 1).

The 5G network 100, as explained before, may be used in order to connect end devices 105*a*, 105*b* and 105*c*, e.g. the connected devices of an IoT network. The end devices may be for example devices for industrial appliances, such as sensors and actuators. As visible in FIG. 1, the end devices 105*a*, 105*b* and 105*c* are connected to the UEs 104*a*, 104*b* or the core network 101 of the 5G network 100. The end devices 105*b* and 105*c* are connected to UEs 104*a*, 104*b* through Device Side Time Sensitive Network (TSN) translators (DS-TT) 107*b*, 107*c*. End device 105*a* is connected to the network core 101 of the 5G network 100 through a Network Side Time Sensitive Network (TSN) translator (NW-TT) 106. According to some embodiments, the end devices 105*a*, 105*b* and 105*c* are wired to the DS-TT 107*a*, 107*b* or the NW-TT 106. According to some other embodiments the end devices are directly connected to the UE and to the core network without any translator device.

According to some embodiments, one end device and one UE may be integrated within a device.

Thus, the end devices 105*a*, 105*b* and 105*c* share data using the 5G network. When implementing time sensitive applications in the IoT network, an accurate time synchronisation between the UEs is mandatory, in particular within the 5G network. In other words, a Time Sensitive Network (TSN) implementing time sensitive applications or services requires accurate time synchronization such that the nodes or elements of the TSN have the same understanding of the time and communication packets are delivered within a time budget.

Figure 2:
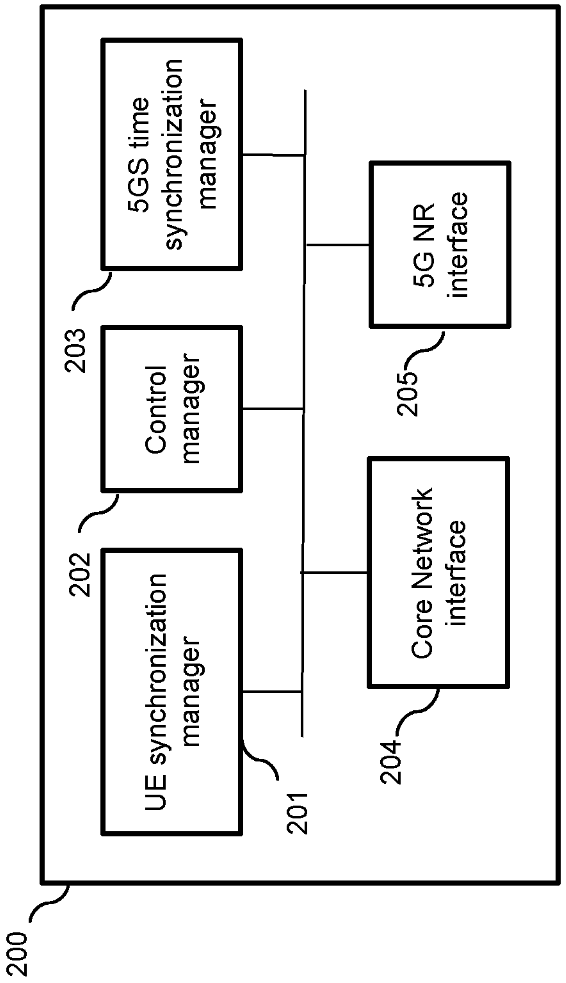
FIG. 2 is a block schematic diagram illustrating an example architecture of a base station of the illustrated 5G network of FIG. 1.

The internal architecture of a base station, such as the gNB 102 of FIG. 1, is illustrated in FIG. 2 by means of a block schematic diagram.

The gNB 200 comprises a communication interface 205, such as 5G New Radio (NR) interface 205, allowing it to communicate with the UEs 104*a*, 104*b* of the 5G network 100. The gNB may also comprise several different types of radio interfaces, such as LTE (4G) or other types of radio interfaces.

In order to communicate with the core network 101, the gNB also comprises a core network interface 204, as defined in TS 23.501 clause 4.2.

The synchronisation of the gNB with the 5G GM clock is handled by a 5GS time synchronisation manager 203.

According to some embodiments, the 5GS time synchronisation manager 203 implements a time counter or timer (not shown) incremented by a local clock oscillator (not shown). The 5GS time synchronisation manager 203 continuously evaluates the clock difference between the time counter and the 5G GM clock. The evaluation may be done using the IEEE 1588 Precise Time Synchronisation Protocol implemented through the exchange of time synchronisation packets with the 5G GM through the Core Network Interface 204. The evaluated difference thus enables the 5GS time synchronisation manager 203 to determine a value to adjust its time counter.

According to some embodiments, 5GS time synchronisation manager 203 continuously evaluates the clock difference between the time counter and the reference time received from a satellite system such as the GPS.

Thus, the 5GS time synchronisation manager 203 provides a current time to the UE synchronisation manager 201 based on its local time counter.

The UE synchronisation manager 201 is configured to handle the synchronisation between the base station and the UEs 104*a*, 104*b* of the 5G network 100 with a view of having time counters of all these devices synchronized as precisely as possible.

To that end, the UE synchronisation manager 201 may implement one or more mechanisms, such as one or more of the mechanisms described hereinafter in relation to FIG. 10. The UE synchronisation manager 201 is also configured to evaluate and record propagation delays between the gNB and each UE 104*a*, 104*b*, for synchronization purposes.

The gNB further comprises a control manager 202 in which the gNB control protocols are implemented. The control protocols comprise at least the following protocols: RLC (Radio Link Control TS 38.322), PDCP (Packet Duplication Control Protocol TS 38.323), RRC (Radio Resources Control TS 38.331) and NAS (Network Access Stratum TS 24.501). The control manager 202 thus handles the generation of the protocol packets exchanged with the core network 101 and the UEs through respectively the Core network interface 204 and the 5G NR interface 205.

The elements of the gNB 200 described above may be implemented in hardware, software, firmware, or any combination thereof. If implemented in software, the functions may be stored on or transmitted over, as one or more instructions or code, a computer-readable medium and executed by a hardware-based processing unit. The processing unit (not shown) may be a single processor or may comprise two or more processors carrying out the processing required for the operation of the gNB 200. The number of processors and the allocation of processing functions to the processing unit is a matter of design choice for a skilled person.

Figure 3:
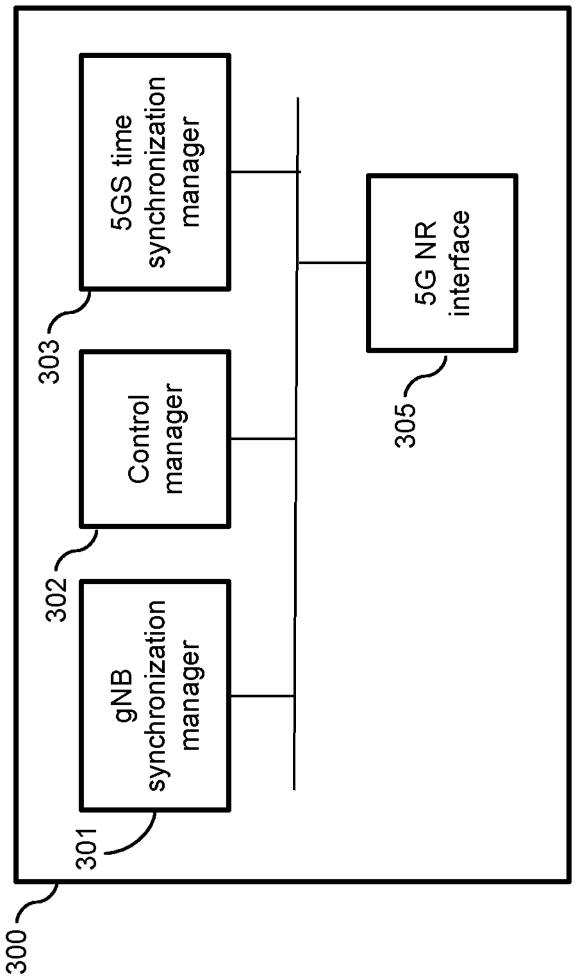
FIG. 3 is block schematic diagram illustrating an example architecture of a user equipment of the illustrated 5G network of FIG. 1.

The internal architecture of an UE, such as the UEs 104*a*, 104*b* of FIG. 1, is illustrated in FIG. 3 by means of a block schematic diagram.

The UE 300 comprises a communication interface 305, such as a 5G NR interface 305 allowing the UE 300 to communicate through this interface with the gNB 200, 102. The UE 300 may comprise several different types of radio interfaces, such as LTE (4G) or other types of radio interfaces.

The synchronisation of the UE with the 5G GM clock is handled by a 5GS time synchronisation manager 303.

According to some embodiments, the 5GS time synchronisation manager 303 implements a time counter or timer (not shown) incremented by a local clock oscillator (not shown). The 5GS time synchronisation manager 303 may correct or change the time counter value when receiving time counter corrections from the gNB synchronisation manager 301 via the 5G NR interface 305.

Indeed, the gNB synchronisation manager 301 stores parameters required for the synchronisation provided by the gNB 102 and determined by UE synchronisation manager 201 of the gNB 102. Besides, the gNB synchronisation manager 301 is also configured to evaluate and record propagation delays between the UE 300 and the gNB 102.

A register in the UE 300 (which register may be part of the gNB synchronisation manager 301 or 5GS time synchronization manager 303) may have a RAN synchronization flag or field to indicate the current status of time synchronization (i.e. RAN synchronization status) in the UE 300. The register may also have a RAN PDC flag or field to indicate the current status of PDC (i.e. PDC status) in the UE 300. When the RAN synchronization flag is set to "ON", this corresponds to a RAN synchronisation state in the UE 300 when the time synchronization process is active and the UE is performing operations according to an activated time synchronization process (e.g. obtaining the reference time, etc.). When the RAN synchronization flag is set to "OFF", this corresponds to a RAN synchronisation state in the UE 300 when the time synchronization process is inactive (i.e. deactivated) and not being used in the UE 300. When the RAN PDC flag is set to "ON", this corresponds to a PDC state in the UE 300 when PDC is active and the UE is performing operations for PDC (e.g. obtaining PDC information, calculating a path delay value, etc.). When the RAN PDC flag is set to "OFF", this corresponds to a PDC state in the UE 300 when PDC is inactive (i.e. deactivated) and not being used in the UE 300. The 5GS time synchronization manager 303 of the UE 300 can set the status of the RAN synchronization flag and the RAN PDC flag in the register. As discussed below, each time a time synchronization control message is sent to change the statuses of the time synchronisation and/or PDC, the states (RAN PDC state and/or RAN synchronisation state) are also modified accordingly in the UE by the 5GS time synchronization manager 303.

The UE 300 further comprises a control manager 302 in which the gNB control protocols are implemented. The control protocols comprise at least the following protocols: RLC (Radio Link Control TS 38.322), PDCP (Packet Duplication Control Protocol TS 38.323), RRC (Radio Resources Control TS 38.331) and NAS (Network Access Stratum TS 24.501). The control manager 302 handles the generation of the protocol packets exchanged with the gNB 200, 102 through the 5G NR interface 305.

The elements of the UE 300 described above may be implemented in hardware, software, firmware, or any combination thereof. If implemented in software, the functions may be stored on or transmitted over, as one or more instructions or code, a computer-readable medium and executed by a hardware-based processing unit. The processing unit (not shown) may be a single processor or may comprise two or more processors carrying out the processing required for the operation of the UE 300. The number of processors and the allocation of processing functions to the processing unit is a matter of design choice for a skilled person.

Data exchanged through 5G NR interfaces 205, 305 between the gNB and the UEs of the network 100 comply with a frame format specified by 3GPP NR PHY and MAC protocols, defined in TS 38.300 clause 5 and 6.

Figure 9:
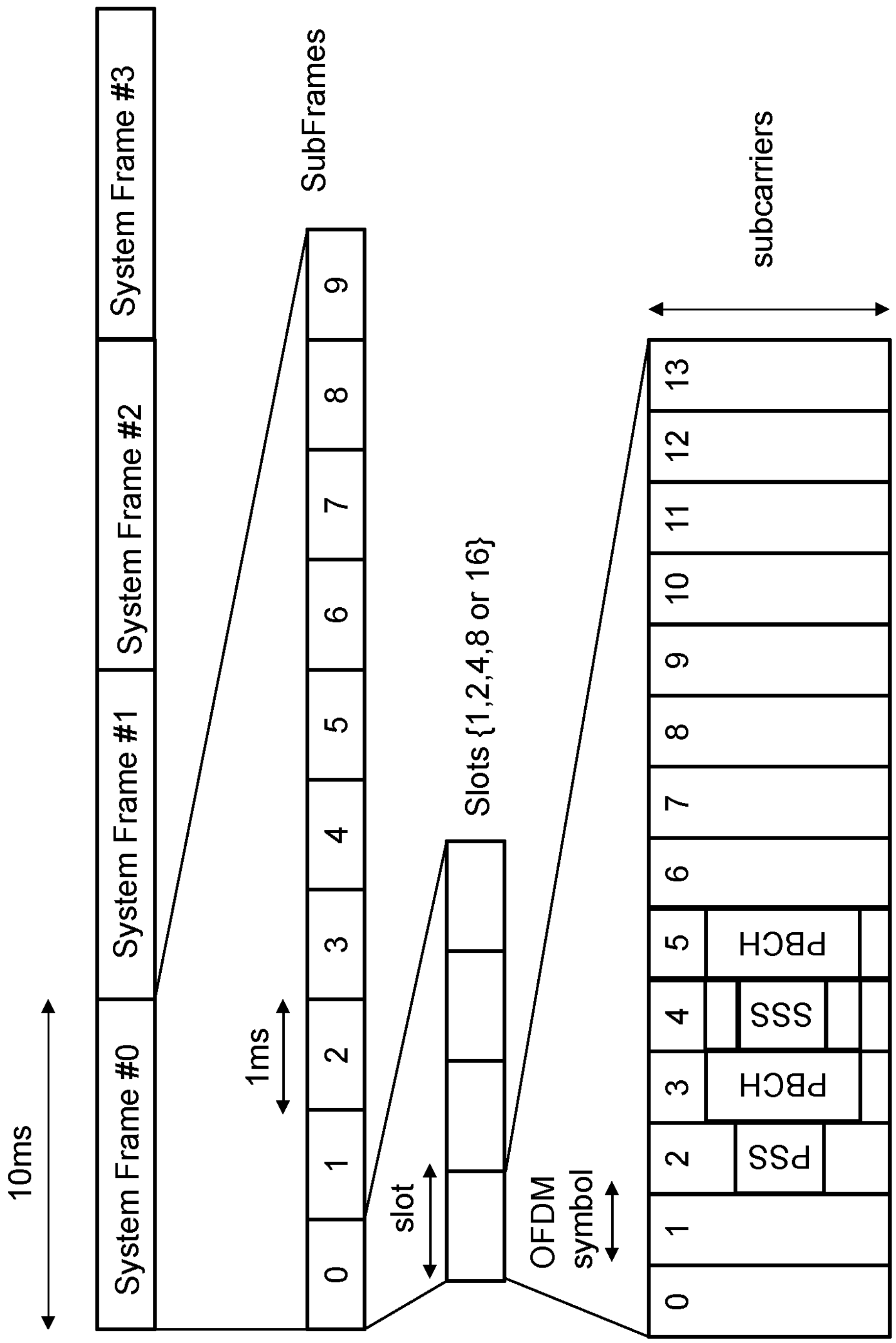
FIG. 9 is a schematic diagram illustrating a system frame of a 5G network.

The exchanged frames, referred to as system frames hereinafter, are timely organized and have a structure as illustrated in FIG. 9.

The system frames follow each other temporally, one after the other. Each system frame has a duration of 10 ms.

The system frames may be numbered with a System Frame Number (SFN), also called an index of the System Frame. As visible, on FIG. 9, the first system frame numbered #0 is followed by the system frames #1, #2 and #3.

The numbering of the system frame may be done in increments, as shown in FIG. 9. In other words, every 10 ms, the system frame number is incremented and may goes from 0 to 1023, and once 1023 is reached, the numbering starts again from 0.

Thus, the gNB numbers the system frames with SFNs. The SFNs are signalled to the UEs using System Frame Synchronization Signal. The System Frame Synchronization Signal is periodically sent by the gNB to the UEs, by signalling the SFN using six most significant bits of a so-called MIB (Master Information Block) field in the transmitted system frames and the four least significant bits of a so-called PBCH field in the transmitted system frames.

Each system frame comprises ten sub-frames ranges from 0 to 9.

Each sub-frame comprises a flexible number of slots, e.g. up to 64 slots. Each slot comprises several orthogonal frequency-division multiplexing (OFDM) slots. Each slot is made up to 14 OFDM slots.

Thus, the system frame constitutes a reference common to the UEs and the gNB. Therefore, system frames, in particular their SFNs, are used for a conventional adjustment of the time counters of the UEs (such as UE 300).

Figure 10:
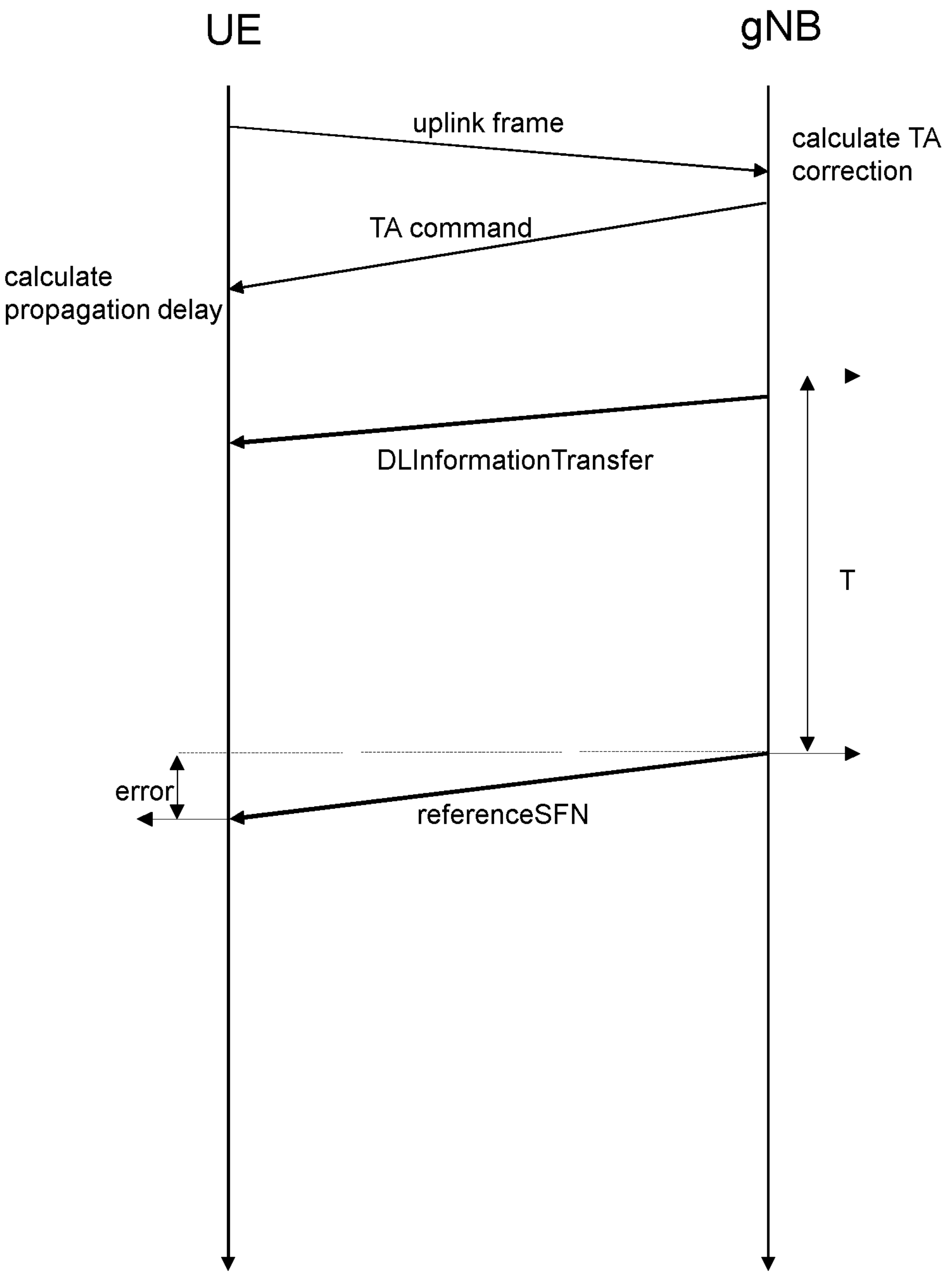
FIG. 10 is a schematic diagram illustrating message flow between an UE and a base station for updating the time counter of the UE.

The conventional adjustment of a time counter of a UE (such as UE 300) is illustrated in FIG. 10.

The conventional time counter adjustment relies on the supplying of a reference time value ($T_R$) to the UE for updating its time counter. The reference time value corresponds to the transmission time of a system frame used as reference. Such a system frame is hereinafter referred to as a reference system frame.

After receiving from the UE a request for a reference time value to update its time counter, or spontaneously, the gNB selects a future reference system frame during which the gNB will compel the UE to update its time counter with the reference time value provided by the gNB.

The reference time value may be for example the intended start or end time of transmission by the gNB of the reference system frame.

According to some embodiments, the reference time value is a projected or intended value of the time counter of the gNB corresponding to the intended start or end transmission time of the reference system frame by the gNB.

As visible on FIG. 10, the reference time is equal to the sum of:

- the current time of the time counter of the gNB, that is continuously synchronized with the 5G GM clock thanks to synchronization manager 203; with
- the duration T which represents the delay (in time counter units) the gNB will wait before transmitting the reference system frame to the UE.

According to some embodiments, the reference time may be for example determined by the gNB as the sum of:

- the current time of the time counter of the gNB that is synchronized to the 5G Grand Master clock thanks to synchronization manager 203;
- the remaining time before the beginning of the next system frame. As a new system frame occurs every 10 ms, the remaining time may be obtained by the means of an alarm counter set to 10 ms at each start of a system frame, and
- 10 ms*(referenceSFN−nextSFN), where referenceSFN is the SFN of the designated reference system frame and nextSFN is the SFN of the next system frame. Note that referenceSFN can be the nextSFN in which case the reference time is calculated just before transmitting the reference system frame and the reference time is included in the reference system frame, which is the case if a SIB9 message is used. Usually, referenceSFN refers to a reference system frame in the future, i.e. referenceSFN−nextSFN>0.

Reference time $T_R$ and an indication of the reference system frame number, referenceSFN for example, are then provided to the UE. Both of these elements may be sent together or separately.

According to some embodiments, the gNB prepares an Information Element (referenceTimeInfo IE) containing reference time $T_R$ and referenceSFN. The referenceTimeInfo IE is then encapsulated in a System Information (SI) or Radio Resource Control (RRC) messages, such as SIB9 or DLInformationTransfer messages.

A DLInformationTransfer message is transmitted prior to the reference system frame, as shown in FIG. 10.

The reference system frame of the SIB9 type directly includes the reference time $T_R$. Thus, no other message in relation with the reference system frame is transmitted before by the gNB.

As shown in FIG. 10, the gNB thus sends the message to the requesting UE or to several UEs if the message with the reference time information is broadcast.

In case a DLInformationTransfer message is transmitted, later on, the reference system frame is generated by the gNB when its time counter is equal to the reference time, and it transmits the reference system frame to the UE (or UEs when the reference time information is broadcast).

Once the reference system frame is detected by the UE(s) based on the referenceSFN, the UE (its managers 301 and 302) which has previously received the reference time (or retrieves the reference time from the SIB9 reference system frame), sets its time counter to the reference time.

In the particular case of SIB9, the reference time corresponds to the end boundary of the system frame.

As shown in FIG. 10 by the timing difference labelled 'error', there is however a delay between the instant when the gNB transmits the reference system frame and the instant when the UE receives the reference system frame. This delay, also called the propagation delay or path delay, represents the time of propagation of the radio signals between the UE and the gNB.

Thus, the above-described synchronization mechanism relies on the assumption that the propagation delay of the reference system frame, used as a trigger by the UE to set its local time counter with the reference time supplied by the gNB, is negligible.

One can understand that a permanent synchronisation error due to propagation delays is introduced when the UE set its time counter using the reference time provided by the gNB. This may not be compatible with some applications (for instance time sensitive applications), in particular applications requiring a precise timestamp of the arrival or departure time of some packets. Indeed, the permanent synchronisation error due to propagation delay introduces an error in the timestamping of those packets and that may be incompatible with the requirements of the time sensitive applications.

In order to overcome this drawback, one of a number of different Path or Propagation Delay Compensation (PDC) processes or mechanisms or schemes to correct or compensate this error in the conventional time counter adjustment of the UE may be used. One example of a PDC process includes the Timing Advance Mechanism described in TS 38.211 clause 4.3.1. Another example is a Round Trip Time (RTT) method.

The Timing Advance (TA) Mechanism may be used to enable the propagation delay to be calculated by the UEs, as illustrated in FIG. 10.

Originally, TA Mechanism is used by the gNB to control the timing of the UEs uplink frames. To do that, the gNB provides to the UE a TA command, comprising several parameters. These parameters, including a TA parameter, enable the UE to determine the time $T_{TA}$ before the next gNB downlink frame at which the UE should start transmitting its uplink frame.

TA commands are provided by the gNB to the UE through the 5G NR interface. For the transmission, TA commands are encapsulated in different types of Protocol Data Unit (PDU), of the following types, all defined in TS 38.321:

Random Access Response MAC Protocol Data Unit (PDU) as defined in TS 38.321, clauses 6.1.5, 6.2.3 and 6.2.3a;

Absolute Timing Advance Command MAC Control Element or Timing Advance Command MAC Control Element, defined in TS 38.321, clause 6.1.3.4 and 6.1.3.4a.

According to the type of TA command, the parameter provided is of a different nature. In the case of the Random-Access Response and the Absolute Timing Advance Command, an absolute value of the parameter TA is provided. In the case of the Timing Advance Command, only a correction of a previously provided TA is included in the TA command.

Thus, according to some embodiments, the TA command may comprise an absolute value of TA in a TA command field, that is then used by the UE to determine the instant $T_{TA}$ according to the following formula:

$$T_{TA} = (N_{TA} + N_{TA,offset}) * Tc,$$

where $N_{TA}$=TA*16*64/$2^{\mu}$ and μ is the subcarrier spacing configuration, Δf=$2^{\mu}$*15 kHz as defined in TS 38.211, clause 4.2, Table 4.2-1, $N_{TA,offset}$ is a fixed offset used to calculate the timing advance, $T_C$ is the Basic time unit for the New Radio as defined in TS 38.211, clause 4.1.

According to other embodiments, as defined in TS 38.213, clause 4.2, the TA command may comprise a correction, referred to as $TA_{correction}$, of a previously provided TA value, $TA_{previous}$. In this case, the adjustment to be applied to previous $T_{TA}$ is equal to $(TA_{correction}-31)*16*64/2^{\mu}$.

Thus, in order to control the UE uplink timing, the gNB sends TA commands in control messages to the UEs of the network. A TA command is specific to a given UE because it mirrors the propagation delay with this specific UE. Next, the UE applies the previously detailed formula to calculate $T_{TA}$.

Interestingly, one may notice that the parameter $N_{TA}$ is proportional to the round-trip time between the gNB and UE. Such a value $N_{TA}$ may help to determine the propagation delay, assuming that the propagation delay is symmetrical. For instance, the propagation delay between the UE and gNB is equal to $(N_{TA}*Tc)/2$.

This way, when receiving a TA command, the UE may be able to determine the propagation delay during the transmission of the TA command. The calculated propagation value may be then used when adjusting the time counter as described hereinbefore, using the reference time and the reference system frame sent by the gNB.

As visible on FIG. 10, a first TA command is received from the gNB and is used by the UE to calculate a propagation delay. Next, when the reference system frame is detected, the time counter is set using the reference time $T_R$ adjusted with the calculated propagation delay. For instance, the time counter is set to a value corresponding to $T_R$ plus the propagation delay.

As will be appreciated from the above discussion, in order to ensure accurate time synchronisation for time sensitive communications (TSC), for example in a communications network, comprising a wireless network as an access network (such as the 5G network 100 described above with reference to FIG. 1), implementing time sensitive applications, a time synchronisation process is used which is based on the periodic transmission of the reference time from the gNBs to the UEs. In order to improve the accuracy of the time synchronisation process, path delay compensation (PDC) may also be performed which is based on the exchange between the UEs and gNBs of dedicated signals to estimate and convey a path delay value. Thus, the time synchronisation process and PDC require radio resources and processing resources in the RAN of the 5G network.

As discussed above, path delay compensation (PDC) requires a computation of the path delay between a UE and its associated gNB. The path delay is related to the UE-gNB distance and is consequently different for each UE. The computation of path delay may be performed according to different methods (e.g. Timing Advance, RTT based) and is usually executed by the gNB. Then, the obtained path delay value is applied to the reference time to compensate the path delay effect. The path delay value may be applied by the gNB i.e. the reference time is modified by the gNB with the path delay value before sending the reference time to the UE, and in this case, the modification of the reference time by the gNB is referred to as pre-compensation. Otherwise, the path delay value is sent individually to each UE and is applied by the UE. For the pre-compensation case, the reference time is potentially different for each UE and thus is sent in an unicast message. When an UE applies the path delay, the reference time is the same for all the UE of the cell and it may be sent in broadcast or multicast message. In some implementations of the wireless network, for example, where the UE and gNB are separated by a short distance (such as less than 30 metres), using PDC may not be required and in fact may be undesirable. For example, the error introduced by PDC may be higher than the error without using PDC.

In order to optimise the use of resources in a RAN (e.g. signalling between and processing at an UE and a base station) of a wireless network (such as the 5G network 100 described above with reference to FIG. 1), embodiments of the present invention are arranged to activate time synchronization in the RAN only when needed and to otherwise deactivate time synchronization to reduce the amount of signalling and processing in the RAN. In some examples, Path Delay Compensation (PDC) may also be activated only when required and otherwise deactivated. By only using PDC when required, this can provide an additional reduction in the amount of signalling and processing in the RAN and also avoids issues when the error introduced by PDC may be higher than the error without using PDC.

Figure 4B:
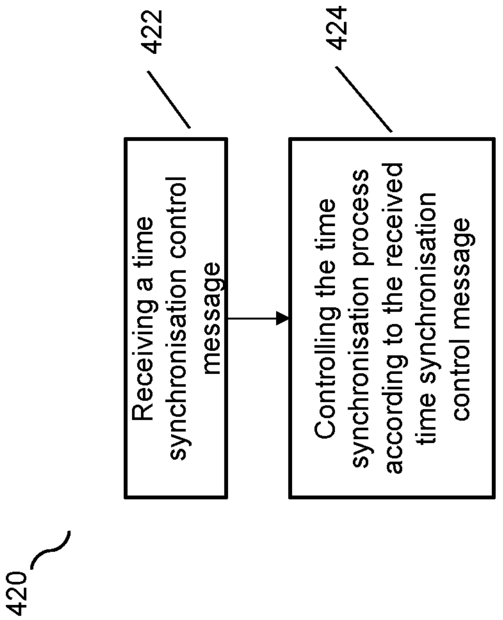
FIG. 4*b* is a flow diagram of a method for controlling time synchronisation in a wireless network according to a second aspect of the invention.
Figure 4A:
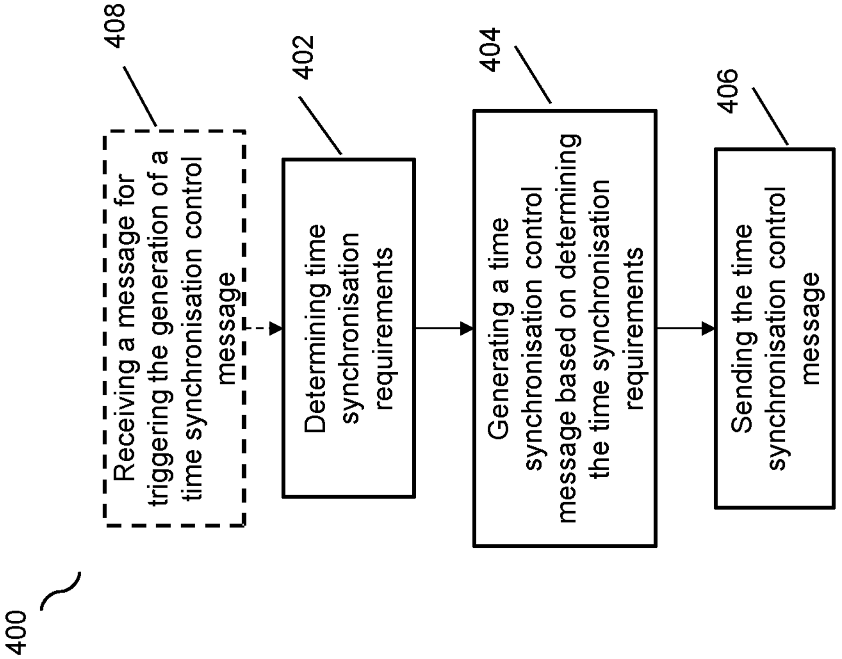
FIG. 4*a* is a flow diagram of a method for controlling time synchronisation in a wireless network according to a first aspect of the invention.

FIG. 4*a* shows steps of a method 400 for controlling time synchronisation in a wireless network (such as the 5G network 100 described above with reference to FIG. 1) comprising a UE and a base station. The method 400 may be performed at the UE (such as the UE 104*a*, 104*b*, 300 described above) or may be performed at the base station (such as base station 102, 200 described above). For the UE, for example, the gNB synchronization manager 301 of the UE may perform the method 400. For the base station or gNB, the UE synchronization manager 201 may perform the method 400.

Briefly, the method 400 comprises determining time synchronisation requirements between the UE 104*a*, 104*b*, 300 and the base station 102, 200, at step 402. At step, 404, a time synchronisation control message for controlling a time synchronisation process or service between the UE and the base station (e.g. for controlling a time synchronisation process in the RAN comprising the UE and the base station) is generated based on the determining at step 402. The time synchronisation control message may include information for controlling activation of the time synchronisation process or information for controlling deactivation of the time synchronisation process or when the time synchronisation is active, information for changing or modifying the time synchronisation process (e.g. changing or modifying options or additional features of the time synchronisation process). The options or additional features may include path delay compensation (PDC) of the time synchronisation process whereby the changing of the time synchronisation process may include enabling or activating PDC or disabling or deactivating PDC. The options or additional features may also include different types or schemes of PDC (e.g. TA, RTT, pre-compensation, etc., some of which are discussed above). Thus, the time synchronisation control message may include information for controlling activation of the time synchronisation process with a particular type of PDC such that the time synchronisation process is activated or enabled with a particular type of PDC (e.g. TA, RTT, pre-compensation, etc.) or information for changing the time synchronisation process to use a different type of PDC. The options or additional features may also include one or more of the following: different types of transport messages for transporting the reference time information, different periodicities for sending the reference time information by the base station, different periodicities for sending PDC information by the base station. Thus, the time synchronisation control message may include information for controlling activation of the time synchronisation process with one or more features for the time synchronisation process and if PDC is required, information for controlling activation of PDC with one or more particular features for the PDC. If the time synchronisation process is already active, the time synchronisation control message may include information for changing the time synchronisation process to use different features for the time synchronisation process and/or information for activating PDC with certain PDC features or deactivating PDC and/or when PDC is already active, information for changing PDC to use different features for PDC. At step 406, the time synchronisation control message is sent to the base station (when the method 400 is performed at the UE) or is sent to the UE (when the method is performed at the base station). When the method is performed at the UE, the UE may also activate or deactivate or change the time synchronisation process at the UE in response to determining the time synchronisation requirements. When the method is performed at the base station, the base station may also activate or deactivate or change the time synchronisation process at the base station in response to determining the time synchronisation requirements.

The time synchronisation process is based on the sending of a reference time by the base station (for example, gNB) to the UE (and possibly other UEs or other nodes in the RAN) in order to achieve time synchronisation between the UE and the base station (and possibly other UEs or other nodes in the RAN) when the base station and UE share a common time or have the same understanding of the time. Options or additional features of the time synchronisation process, such as path delay compensation, may be activated or active for use with the time synchronisation process or deactivated or inactive and not used based on the time synchronisation requirements. When the time synchronisation process is activated or active or enabled at the base station, the base station sends (e.g. periodically) reference time information to the UE (for example in RRC or SIB9 messages) in order to synchronise time at the UE and the base station. In an example, if Path Delay Compensation is also required to improve the accuracy of the time synchronisation process, the base station may also send Path Delay Compensation (PDC) information. When the time synchronisation process is deactivated or disabled at the base station, the base station does not send reference time information to the UE which reduces the amount of signalling between the base station and UE and also the amount of processing at the UE and base station. Similarly, when PDC is deactivated or disabled at the base station, the base station does not send PDC information to the UE which reduces the amount of signalling between the base station and UE and also the amount of processing at the UE and base station. When the time synchronisation process is activated or active or enabled at the UE, the UE operates to obtain the reference time information sent from the base station and to process the received reference time information so as to update the UEs time counter. In an example, if Path Delay Compensation is also required to improve the accuracy of the time synchronisation process, the UE may also operate to obtain Path Delay Compensation (PDC) information sent from the base station and to process the received PDC information so as to update the UEs time counter to compensate for path or propagation delay. When the time synchronisation process is deactivated or disabled at the UE, the UE does not perform operations to obtain and process the reference time information sent by the base station which reduces the amount of signalling between the base station and UE and also the amount of processing at the UE and the base station. Similarly, when PDC is deactivated or disabled at the UE, the UE does not perform operations to obtain and process PDC information from the base station which reduces the amount of signalling between the base station and UE and also the amount of processing at the UE and base station. Thus, by controlling the time synchronisation process in the UE and the base station based on determined time synchronisation requirements, accurate time synchronisation can be achieved when require whilst also ensuring that radio and processing resources are used only when needed rather than used continuously. This may help to reduce the amount of radio and processing resources required in the RAN to achieve accurate time synchronisation.

As shown in dotted lines in FIG. 4*a*, the method 400 may further comprise receiving, at step 408, a message for triggering generation and/or the sending of the time synchronisation control message. Determining, at step 402, may then comprise determining time synchronisation requirements between the UE and the base station based on the received message. In an example, the message may be received from a core network entity of the wireless network.

The message may include a duration time value corresponding to a duration time for which a time synchronization process is to be active. In response to receiving the message, the UE or gNB may send a time synchronisation control message to activate the time synchronisation process and then on expiration of the duration time, the UE or gNB may send a time synchronisation control message for deactivating the time synchronization process. This means that the UE or gNB can automatically deactivate the time synchronization process without the need for a further message from the core network entity to deactivate the time synchronization process.

The message from the core network entity may include information for indicating time synchronisation requirements in the RAN (i.e. between the UE and the base station). For example, the message may be a synchronisation notification sent from a Session Management Function, SMF, of the core network of the wireless network (such as core network 101 of the 5G network 100 in FIG. 1). When the method 400 is performed at the UE, the synchronisation notification may include information or a command (such as a Port Management Information Container, PMIC, information) for enabling or disabling a Device Side TSN translator (DS-TT) function (such as, DS-TT 107*b*, 107*c* in FIG. 1). When the command is for enabling the DS-TT, the UE determines that time synchronisation is required. In this case, the time synchronization process can be activated or enabled. When the command is for disabling the DS-TT, the UE determines that time synchronisation is not required. In this case, the time synchronization process can be deactivated or disabled. When the method 400 is performed at the base station, the message may be a synchronisation notification including information elements (IEs), such as the AN_Synchronization_Notification IEs as discussed below with reference to FIG. 7*d*, for indicating the time synchronisation requirements between the UE and the base station. For example, a first information element indicates the identity of the UE (or all the UEs in the cell of the base station if appropriate) to be configured, a second information element indicates whether the time synchronisation process is to be active or inactive, and a third information element indicates whether path delay compensation is to be active or inactive.

In another example, the message sent from the core network entity, such as a SMF, may be a message associated with a Packet Data Unit, PDU, session between the UE and the base station and may include one or more of: Quality of Service, QoS, information for indicating the QoS required for the PDU session; or session identity information for indicating whether the PDU session is a PDU session for Time Sensitive Communication, TSC, for a Time Sensitive Network, TSN, application; or Single-Network Slice Selection Assistance Information (S-NSSAI) for indicating whether the PDU session is linked to a network slice for TSC. For example, as discussed in more detail below with reference to FIGS. 5*a*-5*c* and 7*a*-7*c*, the message may be, when received at the UE, a PDU SESSION ESTABLISHMENT ACCEPT message, or a UE PDU SESSION RELEASE COMMAND message, or a PDU SESSION MODIFICATION COMMAND, or when received at the gNB, a PDU SESSION RESOURCE SETUP message, or a PDU SESSION RELEASE REQUEST message, or a PDU SESSION RESOURCE MODIFY REQUEST message. The QoS information may include QoS flow description information, such as a 5QI value (discussed in more detail below), which indicates Guaranteed Bit Rate (GBR) and Packet Delay Budget which defines the maximum time that a packet should spend in the network between UE and N6 termination point at UPF (5.7.3.4 in TS23.501). Moreover, a fixed delay for the delay between a UPF terminating N6 and a 5G-AN (gNB) should be subtracted from a given Packet Delay Budget (PDB) to derive the packet delay budget that applies to the radio interface (between UE and gNB). Some examples of the fixed delay are given in the Note associated to the table 5.7.4-1 in the TS23.501. When the QoS information indicates that the PDU session requires a QoS meeting a predetermined time delay criterion or threshold, such as having a delay critical Guaranteed Bit Rate (GBR), it can be detected that the PDU session is a PDU session for a TSC requiring time synchronisation. If the QoS information indicates that the PDU session requires a QoS meeting a second (more stringent) time delay criterion or threshold, such as having a delay critical Guaranteed Bit Rate (GBR) with a very short or low Packet Delay Budget, or a very short or low packet delay budget that applies to the radio interface between the UE and the gNB, (e.g.very short or low may be less than 10 ms or less than 5 ms), it can be detected that the PDU session is a PDU session for a TSC requiring time synchronisation and PDC. The session identity information may include a session identity or identifier which is associated with the PDU session once it has been determined that the PDU session is for a TSC.

In another example (not shown in FIG. 4*a*), the method may further comprise detecting a Packet Data Unit, PDU, session for a Time Sensitive Communication (TSC) for a Time Sensitive Network (TSN) application. Determining, at step 402, may then comprise determining time synchronisation requirements based on the time synchronisation requirements of the detected PDU session for a TSC. In another example, the method may comprise detecting a Packet Data Unit, PDU, session for a time sensitive communication, TSC and determining changes to the PDU session for the TSC. Determining, at step 402, may then comprise determining time synchronisation requirements comprises determining changes to time synchronisation requirements based on the changes to the PDU session for the TSC. In both these examples, detecting a PDU for a TSC may comprise determining a Quality of Service, QoS, required for a PDU session and when the required Quality of Service meets a predetermined time delay criterion (e.g. as discussed above), detecting a PDU session for a TSC, or determining session identity information associated with the PDU session and when the session identity information indicates the PDU session is for TSC (e.g. as discussed above with respect to the session identity or identifier), detecting a PDU session for a TSC.

In an example, the time synchronization control message includes at least one field for controlling the time synchronization process. For example, the time synchronization control message may include a first field for indicating whether the time synchronization process is to be active or inactive (or enabled or disabled) and may also include a second field for indicating whether the path delay compensation is to be active or inactive (or enabled or disabled). In an example, the time synchronisation control message is a MAC Control Element, MAC CE, message having a time synchronization field or flag (e.g. bit 8) for indicating whether the time synchronization process is to be active or inactive and a path delay compensation (PDC) field or flag (e.g. bit 7) for indicating whether the path delay compensation is to be active or inactive. In another example (when the UE sends the time synchronisation control message), the time synchronisation control message is a RRC message, such as an UEAssistance Information message with an Information Element (IE) for providing information for controlling the time synchronization process, such as time synchronization and PDC configuration and activation information. The IE of the UEAssistance Information message may include a refTime-activation field for indicating whether the time synchronization process is to be active or inactive and pdc-Activation field for indicating whether the path delay compensation is to be active or inactive. In another example, the time synchronization control message may be a RRC reconfiguration message. The RRC reconfiguration message may include a RAN_synchronization field for indicating whether the time synchronization process is to be active or inactive and a RAN_pdc field for indicating whether PDC is to be active or inactive. The time synchronization control message sent by the UE (irrespective of whether it is a MAC CE message or RRC message such as a UE AssistanceInformation message or a RRC reconfiguration message) may include one or more additional fields, with each of the one or more additional fields indicating a particular UE preference/configuration for time synchronisation. For example: an additional field may indicate a type of transport message (unicast or broadcast) that is preferred to transport the reference time information from the gNB to the UE; an additional field may indicate the required or preferred periodicity of the sending of the reference time by the gNB (e.g. value in ms or only once); an additional field may indicate the type of PDC (pre-compensation, RTT, TA, enhanced TA, etc.) supported by the UE; an additional field may indicate the periodicity of the sending of the PDC information by the gNB (e.g. value in ms or on demand); an additional field may indicate a scenario or environment in which the UE is operating, such as control-to-control or power grid or other operating scenario in which the UE is being used; an additional field may indicate whether the UE is required to follow a timing error (Te-preference); an additional field may indicate a preferred TA granularity value (value of the step of correction of the TA); or the like. The time synchronization control message sent by the gNB (irrespective of whether it is a MAC CE message or RRC message) may include one or more additional fields, with each of the one or more additional fields indicating a particular configuration for time synchronisation. For example: an additional field may indicate the type of PDC (pre-compensation, RTT, TA, enhanced TA, etc.) being used by the gNB for the time synchronisation process. Details of examples of the time synchronisation control message are provided below.

FIG. 4*b* shows steps of a method 420 for controlling time synchronisation in a wireless network (such as the 5G network 100 described above with reference to FIG. 1) comprising a UE and a base station. The method 420 may be performed at the UE (such as the UE 104*a*, 104*b*, 300 described above) or may be performed at the base station (such as base station 102, 200 described above). For the UE, for example, the gNB synchronization manager 301 of the UE may perform the method 420. For the base station or gNB, the UE synchronization manager 201 may perform the method 420.

Briefly, at step 422, a time synchronisation control message is received. Then at step 424, a time synchronisation process is controlled according to the received time synchronisation control message. When the method 420 is performed at the UE, the UE receives the time synchronisation control message from the base station and the UE controls the time synchronisation process at the UE according to the received time synchronisation control message. When the method 420 is performed at the base station, the base station receives the time synchronisation control message from the UE and the base station controls the time synchronisation process at the base station according to the received time synchronisation control message. The controlling of the time synchronisation process at the UE or the base station may comprise activating or deactivating (or enabling or disabling) the time synchronisation process at the UE or the base station respectively or when the time synchronisation process is already active, it may comprise changing the time synchronisation process (e.g. changing options or additional features of the time synchronisation process), such as activating or deactivating path delay compensation (PDC) at the UE or the base station respectively. Thus, time synchronization in the RAN is activated or enabled only when needed and is otherwise deactivated or disabled which helps to reduce the amount of signalling and processing in the RAN.

As discussed above, in accordance with embodiments of the invention the time synchronisation control message may be sent from the UE to the base station (e.g. gNB) or from the base station (e.g. eNB) to the UE. More details of embodiments of the invention will now be provided.

In a first embodiment, the UE (such as UE 104*a*, 104*b*, of FIG. 1, UE 300 of FIG. 3—it is noted that, for simplicity, only the reference numeral 300 will be used for the UE in the following) determines time synchronisation requirements between the UE and the base station (such as gNB 102 of FIG. 1 and gNB 200 of FIG. 2—it is noted that, for simplicity, only the reference numeral 200 will be used for the base station or gNB in the following) and generates a time synchronisation control message in response. For example, the UE 300 determines whether time synchronisation is required or not or whether changes are required (such as activating or deactivating PDC) for an already active time synchronisation process. The UE 300 may receive a message which triggers the creation of a time synchronization control message. The time synchronisation control message includes information for controlling the time synchronisation process, such as activating or deactivating the time synchronisation process, or changing an active time synchronisation process (e.g. changing options or additional features of the time synchronisation process), such as by activating or deactivating path delay compensation. For example, this time synchronization control message may contain a field for controlling the activation/deactivation of the time synchronization process at the gNB 200. The time synchronization process is based on the sending of the reference time by the gNB 200 to the UE 300 in order to share a common time in between all nodes in a same cell. Moreover, to improve the accuracy of the time synchronization, a path delay compensation may be performed.

In an example, determining time synchronization requirements between the UE 300 and the gNB 200 may be based on detecting a Packet Data Unit, PDU, session for a Time Sensitive Communication (TSC) for a TSN application and determining the time synchronisation requirements for the PDU session for the TSC (e.g. during a PDU session establishment procedure) or based on detecting a Packet Data Unit, PDU, session for a Time Sensitive Communication (TSC) for a TSN application and determining changes to the TSC PDU session, such as during a PDU session release procedure or a PDU session modification procedure.

Figure 5A:
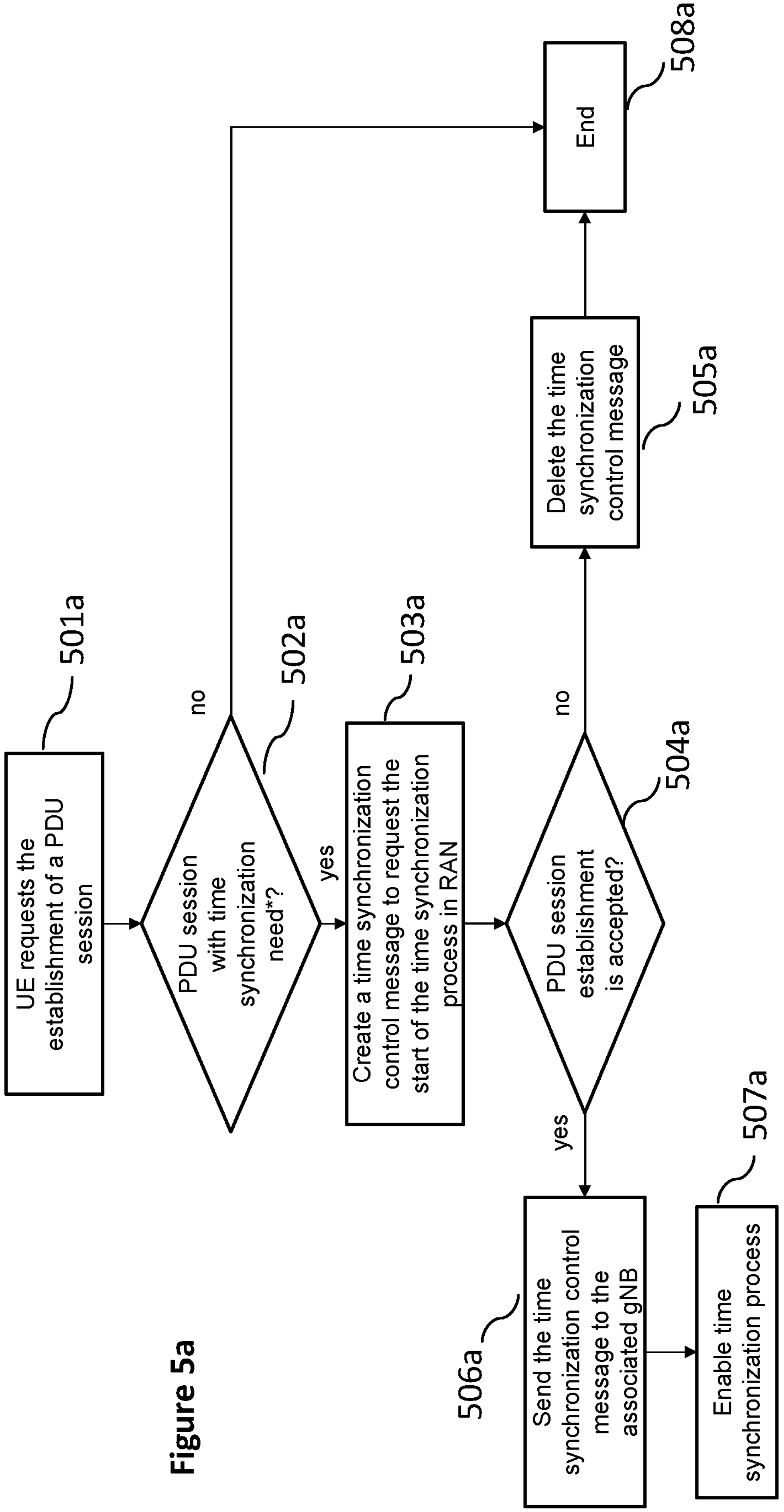
FIG. 5*a* illustrates a flow diagram of an example method, according to an embodiment, performed by the UE when it is triggered by a PDU session establishment.

Referring now to FIG. 5*a*, which shows a flow diagram of an example method, according to an embodiment of the invention, which is performed by a UE 300 when it is triggered by a PDU session establishment.

First, at step 501*a*, the UE 300 requests the establishment of a PDU session such as described in the TS24.501 section 6.4.1. A PDU SESSION ESTABLISHMENT REQUEST is sent to a core network entity, such as the Session Management Function (SMF), which is part of the core network (such as the 5G core network 101 of FIG. 1). This PDU SESSION ESTABLISHMENT REQUEST message contains all information required to establish the PDU session. A determination is made at step 502*a*, as to whether this PDU session has some specific time synchronisation requirements in terms of time synchronization (i.e. it does or does not require or need time synchronization and possibly if it does require or need time synchronization, with or without PDC). For example, at step 502*a*, a determination is made by the UE 300 as to whether a Packet Data Unit, PDU, session for a Time Sensitive Communication (TSC) is detected. In a context of Time Sensitive Network application, the 5G system is integrated in a TSN system as a TSN bridge. Some specific entity i.e. DS-TT (Device Side TSN Translator 107*b*, 107*c*) and NW-TT (Network Side TSN Translator 106) are responsible for the translation between TSN domain and 5G domain. The DS-TT is associated with the UE 300 (e.g. attached or embedded in UE 300) specific to TSN application and NW-TT is attached to the User Plane Function (UPF) in the core network. The presence of a DS-TT in the UE implies that the UE 300 will be involved in a Time Sensitive Communication (TSC) and thus it can be inferred there will be a need for time synchronization for the TSC. To configure the DS-TT, the 5G core network uses the Port Management Information message, which is a control message including information to configure the DS-TT. So when a DS-TT is linked to a UE 300, the PDU SESSION ESTABLISHMENT REQUEST message includes the DS-TT parameters: TPMIC (Transfer of Port Management Information Containers 9.11.4.12 in TS24.501) bit is set in the 5GSM capability Information Element and the Port Management Information Container (9.11.4.27) is populated. Thereby, when the PDU SESSION ESTABLISHMENT REQUEST includes DS-TT parameters, the RAN will also need time synchronization. In other words, in an example implementation, when the UE 300 is linked to or associated with a DS-TT, when requesting the establishment of a PDU session, the UE 300 includes DS-TT parameters in the PDU SESSION ESTABLISHMENT REQUEST message and detects that the requested PDU session is for a TSC and thus, that time synchronization between the UE 300 and gNB 200 of the RAN is required.

The PDU SESSION ESTABLISHMENT REQUEST also contains a PDU session identity or identifier which is used to identify a PDU session. This PDU session ID is present in all messages to control the PDU session. When the PDU session is classified with a need of time synchronization during step 502*a*, the UE 300 also associates the PDU session identity with the need of time synchronization. Consequently, in the following PDU session procedure, the UE may know if the session is classified with time synchronization need only based on the PDU session identity.

Otherwise, if there is no need of time synchronization (no branch at step 502*a*), the UE goes to the end step 508*a*. In this case, it is assumed that since it is determined at step 502*a* that the PDU session does not require time synchronization, time synchronization is not active and has not been previously activated because the messages sent as part of the PDU session establishment procedure are some of the first messages that are able to exchange data between the UE 300 and the gNB 200. In another example, if the time synchronization process is enabled by default in the RAN and so is active when making the determination at step 502*a*, the UE 300 may generate and send to the gNB 200 a time synchronization control message to inform the gNB that the UE does not require time synchronization and that the time synchronization process may be deactivated or disabled.

Once the UE 300 has determined its need of time synchronization, it shall inform the gNB about its time synchronization requirement in order for the gNB 200 to setup and activate the time synchronization i.e. to send the reference time info and optionally perform the PDC computation. Thus, when requesting establishment of a PDU session which is determined to require or need time synchronization during step 502*a* (yes branch at step 502*a*), the UE 300 generates or creates a time synchronization control message at step 503*a*. After, the creation or generation of the time synchronization control message (step 503*a*), the UE 300 waits for the feedback of the core network for the PDU session establishment in order to determine whether the PDU session establishment has been accepted or not (step 504*a*). Upon reception of a PDU SESSION ESTABLISHMENT ACCEPT message (yes to step 504*a*) from the SMF of the core network, the UE 300, during step 506*a*, sends the time synchronization control message to its associated gNB 200 and enables the time synchronization process during step 507*a*.

In other words, during step 507*a*, the UE 300 sets RAN synchronization and RAN PDC status to "ON" (for example, as discussed above, the 5GS time synchronization manager 303 sets the RAN synchronization flag and RAN PDC flag in a UE register to "ON") and tracks the reception of the reference time from the gNB and potentially the message related to the path delay compensation. Otherwise, upon the reception of a PDU SESSION ESTABLISHMENT REJECT (no branch at step 504*a*), the UE 300 deletes the time synchronization control message (step 505*a*) and finishes the method (step 508*a*).

In another example implementation, the UE 300 may use the QoS parameters included in the PDU SESSION ESTABLISHMENT ACCEPT message to make a determination, at step 502*a*, as to whether the PDU session has some specific requirement in term of time synchronization (i.e. it requires or needs time synchronization). For example, to make a determination as to whether a Packet Data Unit, PDU, session for a Time Sensitive Communication (TSC) is detected. The UE parses the QoS flow description information element (9.11.4.12.1 in TS 24.501) included in the PDU SESSION ESTABLISHMENT ACCEPT to check the 5QI parameter. If for example the 5QI value corresponds to a delay critical GBR (#82, #83, #84, #85) or any other value representative of a time synchronization need (new 5QI value), the UE 300 determines there is a requirement or need for time synchronization (e.g. the PDU session is for a TSC) and determines the time synchronization requirements and then prepares a time synchronization control message to request the activation of the time synchronization process in the Radio Access Network (RAN). The need for time synchronization can be determined if a PDU session is accepted with 5QI #82, or #83, or #84, or #85 in the QoS parameters. The standardized 5QI to QoS characteristics mapping is described in the table 5.7.4-1 in the 3GPP Technical Specification TS23.501. The smart grid scenario defined in the 3GPP consortium (RAN2 group) is similar to Electricity distribution (5QI #85) and control-to-control is similar to discrete automation (5QI #82 or #83) defined in the delay critical GBR 5QI. One of the most important QoS characteristic for the Time Sensitive Communication is the Packet Delay Budget which defines the maximum time that a packet should spent in the network between UE and N6 termination point at UPF (5.7.3.4 in TS23.501). Moreover, a fixed delay for the delay between a UPF terminating N6 and a 5G-AN (gNB) should be subtracted from a given Packet Delay Budget (PDB) to derive the packet delay budget that applies to the radio interface (between UE and gNB). Some examples of the fixed delay are given in the Note associated to the table 5.7.4-1 in the TS23.501. For instance, the 5QI #85 has a Packet Delay Budget equals to 5 ms and may be considered as requiring a time synchronization at RAN level and 5QI #3 has a Packet Delay Budget equals to 50 ms, may be considered as having no need of time synchronization at RAN level. Upon determination of the time synchronization need, the UE sends a signaling message (e.g. time synchronization control message) to the gNB to start the RAN time synchronization. For example, the need for time synchronization can be determined if a PDU session is accepted with QoS parameter reflecting Packet Delay Budget value (or packet delay budget that applies to the radio interface between the UE and the gNB) below a threshold or time delay criterion (e.g. less than 10 ms or less than 5 ms).

The need for time synchronization may be determined for Single Network Slice Selection Assistance Information (S-NSSAI) value with Slice Service Type (SST) set for Ultra Reliable Low Latency Communication (URLLC).

In another example implementation, the UE 300 may use the Single Network Slice Selection Assistance Information (S-NSSAI clause 9.11.2.8 in TS 24.501) included in the PDU SESSION ESTABLISHMENT ACCEPT message to make a determination, at step 502*a*, as to whether the PDU session has some specific requirement in term of time synchronisation (i.e. it requires or needs time synchronisation). The network slicing allows building several logical networks with different requirements on top of the same physical infrastructure. The identification of the network slice is done with the S-NSSAI. The S-NSSAI (as defined in clause 5.12.2.1 in TS 23.501) is made up of two fields: the SST for Slice Service Type which is mandatory and refers to the expected Network Slice behaviour in terms of features and services; and the SD Slice Differentiator which is an optional information that complements the Slice/Service type(s) to differentiate amongst multiple Network Slices of the same Slice/Service type. Currently, 5 different values of service are standardized as illustrated in the table 5.15.2.2-1 in TS 23.501. For example, to make a determination as to whether a Packet Data Unit, PDU, session for a Time Sensitive Communication (TSC) is detected, the UE checks the S-NSSAI value. If the S-NSSAI value corresponds to a value representative of a time synchronization need, the UE 300 determines there is a requirement or need for time synchronization and then prepares a time synchronization control message to request the activation of the time synchronization process in the Radio Access Network (RAN). The S-NSSAI representative of a time synchronization need may be for example a new SST value for the Time Sensitive Communication amongst the unused value for standardized SST value (from 0 to 127); or one SST value in the range of the operator specific value (from 128 to 255) for a TSC services supported by dedicated operators; or using a particular SD value to particularize the current standardized services, for example SST value=2 for Ultra Reliable Low Latency Communication with a SD=1 for a Time Sensitive addon. The knowledge of the specific value for the Time Sensitive communication may be either standardized or shared during a preliminary procedure (as described in clause 5.15 in TS23.501) e.g. the registration of the UE to the core network.

In an alternative example to that shown in FIG. 5*a*, the time synchronization control message may be sent by the UE 300 to the gNB 200 directly after being generated or created in step 503*a* and before the acceptance of the PDU session establishment (e.g. before the reception of a PDU SESSION ESTABLISHMENT ACCEPT message) to start the time synchronization process before the establishment. In some cases, if the priority of the PDU session is high, the probability of the acceptance of the PDU session is high. And if finally, the PDU session is rejected (e.g. upon the reception of a PDU SESSION ESTABLISHMENT REJECT message), the UE 300 can send another time synchronization control message to stop or deactivate the time synchronization process.

Figure 5B:
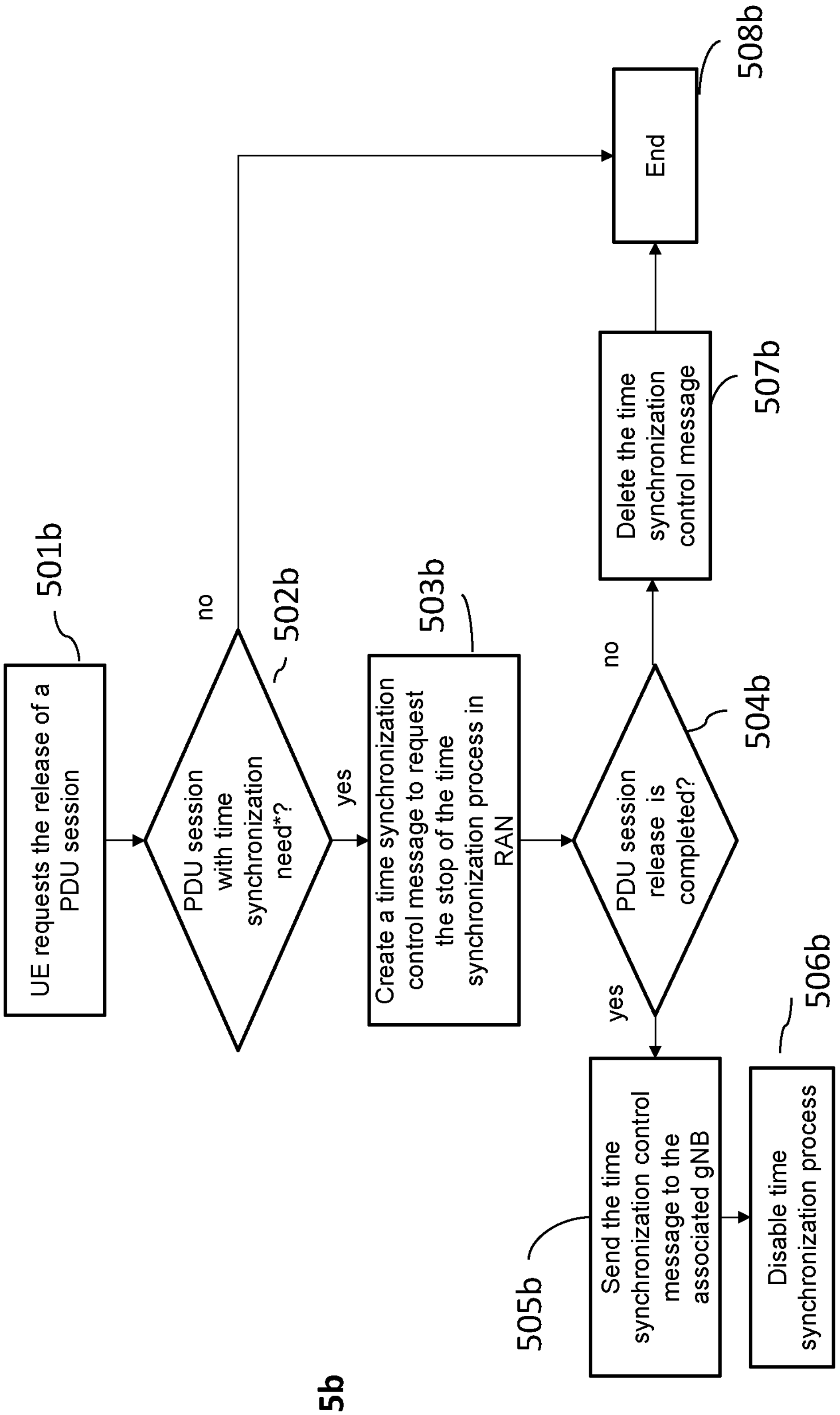
FIG. 5*b* illustrates a flow diagram of an example method, according to an embodiment, performed by the UE when it is triggered by a PDU session release.

Referring now to FIG. 5*b*, which shows a flow diagram of an example method, according to an embodiment of the invention, which is performed by a UE 300 when it is triggered by a PDU session release.

First, at step 501*b*, the UE 300 requests the release of a PDU session such as described in the TS24.501 section 6.4.3. A PDU SESSION RELEASE REQUEST is sent to a core network entity, the Session Management Function (SMF). The message mainly contains the cause of the release and the PDU session identity.

As explained above, the PDU session identity or identifier is used to identify a PDU session. Moreover, during the PDU session establishment, the UE has associated the need of time synchronization to the PDU session ID (step 502*a* of FIG. 5*a*). Thus, in step 502*b*, to check whether the PDU session for which the release has been requested is a PDU session with time synchronization need, the UE 300 uses the PDU session ID and verifies if the PDU session is flagged as time synchronization required.

If the PDU session is identified as a session with time synchronization need (yes branch at step 502*b*), the UE 300 creates or generates a time synchronization control message (503*b*) to stop or deactivate the time synchronization process in the RAN.

Otherwise, if the session is not a session with time synchronization (no branch at step 502*b*), the UE goes to the end step 508*b*.

After, the creation or generation of the time synchronization control message, during step 504*b*, the UE 300 waits for feedback from the core network for the PDU session release. Upon reception of a PDU SESSION RELEASE REQUEST message and a PDU session ID, if the SMF (core network entity) accepts the request to release the PDU session, the SMF shall perform the network-requested PDU session release procedure (as specified in subclause 6.3.3 in TS 24.501) i.e. the SMF sends back to the UE 300 a PDU SESSION RELEASE COMMAND and the UE responds with a PDU SESSION RELEASE COMPLETE. Consequently, upon reception of a PDU SESSION RELEASE COMMAND (yes branch at step 504*b*), the UE 300 considers that the release is accepted, then, the UE sends the time synchronization control message to its associated gNB (step 505*b*). Then before disabling the time synchronization (at step 506*b*), the UE checks whether other PDU session with time synchronization need are always active. If there is no more active PDU session with time synchronization need, the UE disables or deactivates the time synchronization process at the UE, at step 506*b*. In other words, the UE stops tracking the reception of the reference time from the gNB and potentially the message related to the path delay compensation. Also, the statuses of RAN synchronization and RAN PDC will be set to “OFF” (for example, as discussed above, the 5GS time synchronization manager 303 sets the RAN synchronization flag and RAN PDC flag in a UE register to “OFF”). Else, if at least one PDU session with time synchronization need is always active, the time synchronization remains enabled or active.

Otherwise, upon the reception of a PDU SESSION RELEASE REJECT (no branch at step 504*b*), the UE 300 deletes the time synchronization control message (507*b*) and finishes the method (step 508*b*).

In an alternative example, the release request procedure is initiated by the network in place of the UE in step 501*b*. In this case, the UE receives a PDU SESSION RELEASE COMMAND message from the core network and checks whether the PDU session identity or identifier in the PDU SESSION RELEASE COMMAND message is associated to time synchronization need as described above. Then the UE performs the same steps from 502*b* to 508*b* (except omitting steps 504*b* and 507*b*).

Figure 5C:
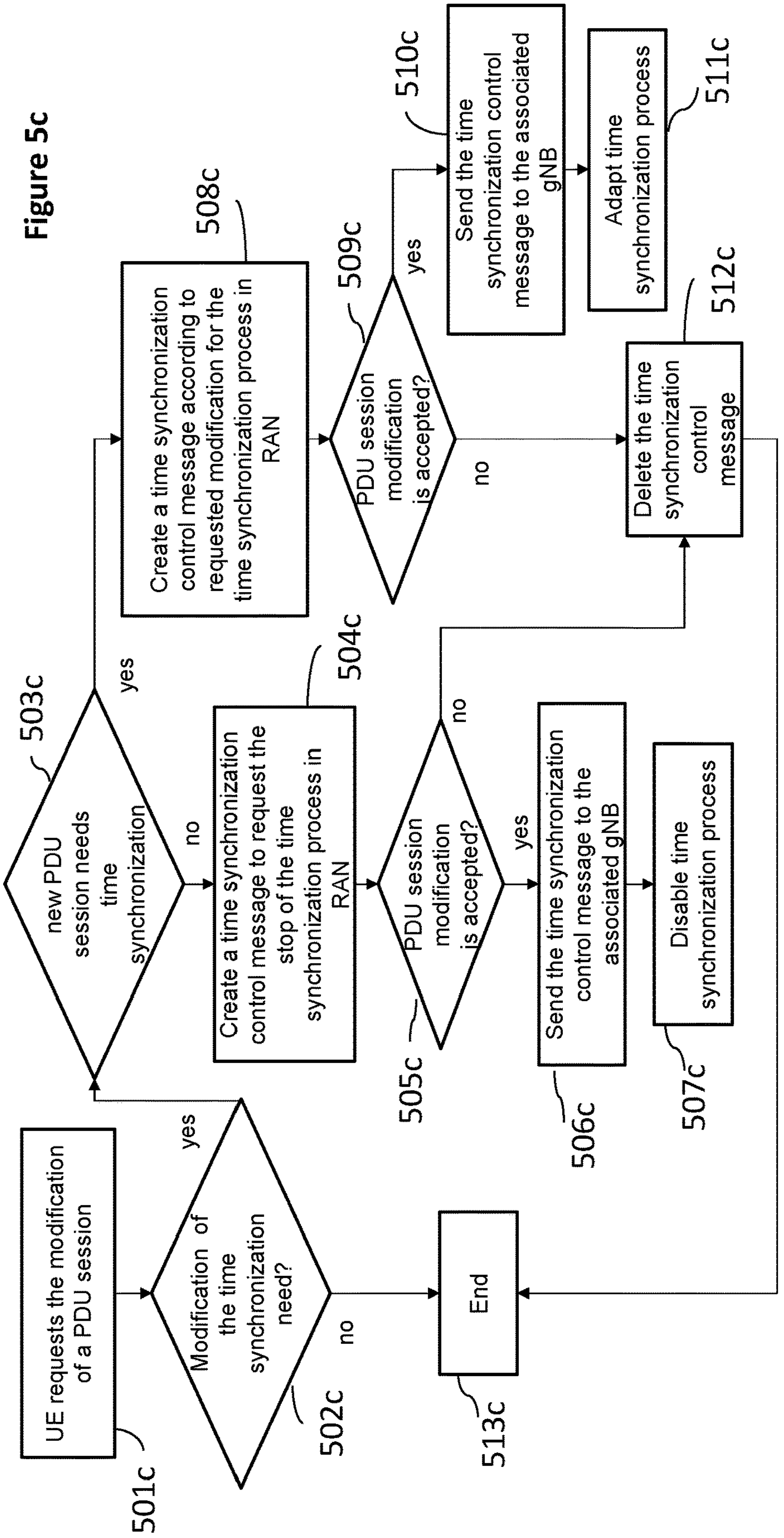
FIG. 5*c* illustrates a flow diagram of an example method, according to an embodiment, performed by the UE when it is triggered by a PDU session modification.

Referring now to FIG. 5*c*, which shows a flow diagram of an example method, according to an embodiment of the invention, which is performed by a UE 300 when it is triggered by a PDU session modification.

First at step 501*c*, the UE 300 requests or receives a modification of a PDU session (described in the TS24.501 clause 6.4.2 for the UE-requested PDU session modification procedure and 6.3.2 for the Network-requested PDU session modification procedure). A PDU SESSION MODIFICATION REQUEST is sent to a core network entity, the Session Management Function (SMF). As for the PDU session establishment procedure, the message includes a Requested QoS flow descriptions field with the QoS flow description information element (9.11.4.12.1 in TS 24.501). The UE 300 can check the 5QI parameter included in the QoS flow description. If the 5QI value corresponds to a delay critical Guaranteed Bit Rate GBR (#82, #83, #84, #85) or any other value representative of a time synchronization need (new 5QI value), the UE can determine the time synchronization requirement and in particular that there is a need or requirement of time synchronization. The PDU SESSION MODIFICATION REQUEST may also contain the DS-TT parameters as described above with respect to FIG. 5*a* related to the PDU session establishment procedure i.e. the Port Management information container and the 5GSM capability with the TPMIC bit. The UE 300 checks, during step 502*c*, whether the modification has an effect on the time synchronization need (i.e. the modified PDU session requires or needs modified time synchronization requirements) based on, for example, the parameters of QoS or parameters of the DS-TT. When the modification of the PDU session results in a modification of the time synchronization requirement or need (yes branch at step 502*c*), there are two different cases.

Case 1: The PDU session is modified from a PDU session with a time synchronization need to a PDU session without a time synchronization need (yes branch at step 502*c*, no branch at step 503*c*). For instance, the 5QI may be modified from a value associated to a low Packet Delay Budget (e.g. 5QI #85 with a PDB=5 ms) to a value associated to a high Packet Delay Budget (e.g. 5QI #3 with a PDB=50 ms) i.e. the modified PDU session has no more need of time synchronization. In that case, the UE 300 creates or generates a time synchronization control message to request the stopping or deactivation of the time synchronization process in RAN (at step 504*c*). Then, the UE waits for feedback from the core network entity for the PDU session modification (505*c*).

Upon receipt of a PDU SESSION MODIFICATION REQUEST message, if the SMF accepts the request to modify the PDU session, the SMF (core network entity) shall perform the network-requested PDU session modification procedure (as specified in clause 6.3.2 in TS24.501) i.e. the SMF sends back to the UE 300 a PDU SESSION MODIFICATION COMMAND and the UE 300 responds with a PDU SESSION MODIFICATION COMPLETE or a PDU SESSION MODIFICATION COMMAND REJECT (less likely to occur if the modification is requested by the UE). Consequently, upon reception of a PDU SESSION MODIFICATION COMMAND, the UE 300 considers that the modification is accepted (yes branch at step 505*c*), then, the UE 300 sends the time synchronization control message to its associated gNB (at step 506*c*). Then before disabling the time synchronization, the UE 300 checks whether other PDU sessions with time synchronization need are still active. If there is no more active PDU session with time synchronization need, the UE 300 disables or deactivates the time synchronization process at the UE (at step 507*c*). In other words, the UE 300 stops tracking the reception of the reference time from the gNB and potentially the message related to the path delay compensation. Also, the UE sets the statuses of RAN synchronization and RAN PDC to "OFF". Else, if at least one PDU session with time synchronization need is still active, the time synchronization remains enabled or active.

Upon reception of the PDU SESSION MODIFICATION REJECT (no branch at step 505*c*), the modification requested is rejected and the UE deletes the time synchronization control message (step 512*c*) and finishes the method (step 513*c*).

Case 2: The PDU session is modified from a PDU session without time synchronization need to a PDU session with a time synchronization need or a PDU session with some adaptation of the time synchronization need (yes branch at step 502*c*, yes branch at step 503*c*). For example, the DS-TT parameters are added in the PDU SESSION MODIFICATION REQUEST message while they were initially absent during the PDU session establishment. In another example, the 5QI may be modified from a value associated to a high Packet Delay Budget (e.g. 5QI #3 with a PDB=50 ms) to a value associated to a low Packet Delay Budget (e.g. 5QI #85 with a PDB=5 ms) i.e. the modified PDU session has a need of time synchronization. The PDU session may be modified with a Packet Delay Budget which requires a time synchronization but with more stringent budget requirement. With a more stringent budget requirement, the time synchronization may require for instance the path delay compensation in addition to the main time synchronization process. In the other side, the modification may release the packet budget delay constraint and as a result the path delay compensation may become useless and so not required.

The UE 300 then creates or generates a time synchronization control message to reflect the requested modification (step 508*c*). For instance, in the case of a modification which requires time synchronization with path delay compensation, the UE 300 generates a time synchronization control message to request the start of the time synchronization process in RAN with path delay compensation. The time synchronization control message generated by the UE 300 may be based on a MAC CE described below with reference to FIG. 11. With such a MAC CE time synchronization control message, the time synchronization field or flag (bit 8) of the time synchronization control message is set to enable or 'ON' and the path delay compensation field or flag (bit 7) of the time synchronization control message is also set to enable or 'ON'. Then, the UE 300 waits the feedback from the core network entity for the PDU session modification.

Upon receipt of a PDU SESSION MODIFICATION REQUEST message, if the SMF accepts the request to modify the PDU session, the SMF (core network entity)

shall perform the network-requested PDU session modification procedure (as specified in clause 6.3.2 in TS24.501) i.e. the SMF sends back to the UE 300 a PDU SESSION MODIFICATION COMMAND and the UE 300 responds with a PDU SESSION MODIFICATION COMPLETE or a PDU SESSION MODIFICATION COMMAND REJECT (less likely to occur if the modification is requested by the UE). Consequently, upon reception of a PDU SESSION MODIFICATION COMMAND, the UE 300 considers that the modification is accepted (yes branch at step 509*c*), then, the UE 300 sends the time synchronization control message to its associated gNB (at step 510*c*). Then, at step 511*c*, depending on whether the PDU session is modified from a PDU session without requiring time synchronization to a PDU session which does require time synchronization or a PDU session with some adaptation of the time synchronization requirements, the UE 300 activates time synchronization or adapts its own time synchronization process based on the requested modification (e.g. track the reference time and path delay compensation message, modifications of the statuses RAN synchronization and RAN PDC).

Upon reception of the PDU SESSION MODIFICATION REJECT (no branch at step 509*c*), the modification requested are rejected and the UE 300 deletes the time synchronization control message (step 512*c*) and finishes the method (513*c*).

In another example, the UE 300 can determine the time synchronization requirement and any changes to the time synchronization requirement based on S-NSSAI in a message received from a core network entity. For example, the message may be a CONFIGURATION UPDATE COMMAND received by the UE 300 from the Access and Mobility Management Function (AMF) in the core network. The S-NSSAI may be changed through this message as described in the Generic UE configuration update procedure (clause 5.4.4 in TS24.501). In such a case, the UE 300 may determine from the message received from the AMF that the S-NSSAI value may be modified from a value associated to time sensitive communication (e.g. SST value=5 for ultra-reliable low latency communications or a new SST value=6 for Time Sensitive Communication) to a value without time synchronization requirement (e.g. SST value=1 for 5G enhanced Mobile Broadband) or a S-NNSAI value with existing SST value (e.g. SST=5 for ultra-reliable low latency communications) and from a SD representative of a time synchronization need to a SD value or no SD field in the message i.e. the PDU session has no more time synchronization requirement. In this case as in step 504*c* for Case 1 above, the UE 300 creates or generates a time synchronization control message to request the stopping or deactivation of the time synchronization process in RAN.

Figure 5D:
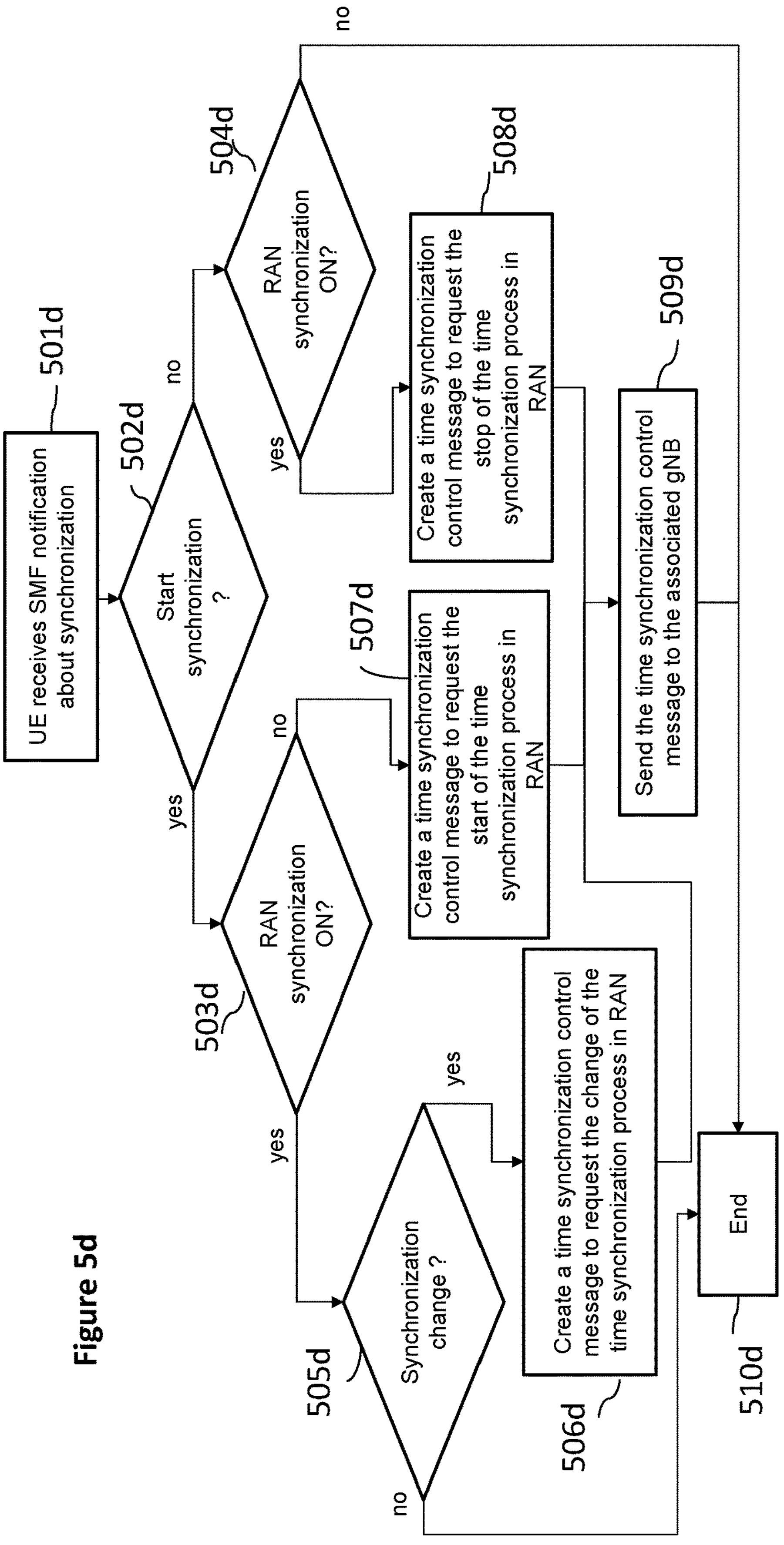
FIG. 5*d* illustrates a flow diagram of an example method, according to an embodiment, performed by the UE when it is triggered by a SMF synchronization notification.

Referring now to FIG. 5*d*, which shows a flow diagram of an example method, according to an embodiment of the invention, which is performed by a UE 300 when it is triggered by a synchronisation notification received from a core network entity of the wireless network (e.g. a core network entity of the core network 101 of the 5G network 100 of FIG. 1). In other words, the UE may also be instructed by entities in the core network to start the RAN time synchronization.

In the initial step 501*d*, the UE 300 receives a synchronisation notification from a core network entity, such as the SMF (Session Management Function). For example, the notification is in the shape of a Port Management Information Container (PMIC) message as defined in TS 24.501, clause 9.11.4.27.

The PMIC carries information defined in TS 23.501, clause 5.28.3.1. The information carried in the PMIC is for configuring the DS-TT and particularly the Precision Time Protocol which ensures the synchronization of the TSN application. This includes port information elements such as "PTP instance ID", "defaultDS.clockIdentity" and "defaultDS.instanceEnable". The Port Information "PTP instance ID", "defaultDS.clockIdentity" and "defaultDS.instanceEnable" in the PMIC message may be used to inform the UE about start or activation and stop or deactivation of the time synchronization process or service as described in TS 23.501, clause K.2.2. The "PTP instance ID", "defaultDS-.clockIdentity" and "defaultDS.instanceEnable" port information can be exchanged between core network and UE to activate the RAN time synchronization. Another parameter of the configuration information supplied by the PMIC message is the PTP profile (defined in IEEE Std 1588-2019 clause 20.3.3). Each PTP profile defines a set of parameters to support more or less stringent application in term of synchronization accuracy. The PTP profile may be used to determine the need of PDC in addition to the time synchronization.

In the step 502*d*, the UE 300 checks "defaultDS.instanceEnable" port information in the received synchronisation notification PMIC message.

If "defaultDS.instanceEnable" is "True" then during step 503*d*, the UE 300 checks the status of the RAN synchronization. If RAN synchronization is set to "OFF" (no branch at step 503*d*), then during step 507*d*, the time synchronization control message is created or generated to start or activate the time synchronization process in the RAN between the UE 300 and gNB 200. In other words, the SMF may instruct the UE to start the RAN clock synchronization (or RAN time synchronization) through Port Management Information writing. If the RAN synchronization is "ON" (yes branch at step 503*d*) then during step 505*d*, the UE 300 checks the values of the port information received in the synchronisation notification PMIC message (at step 501*d*) to determine whether the time synchronization requirements have changed such that there is a need to change the time synchronization process by changing for example options or additional features like the PDC (Path Delay Compensation). If the time synchronization requirements have changed (yes branch at step 505*d*), then during step 506*d*, the UE 300 generates or creates a time synchronization control message to change the RAN synchronization options. If the time synchronization requirements have not changed (no branch at step 505*d*), then there is no need to send a time synchronization control message, and the UE 300 goes to the end step 510*d*.

If, at step 502*d*, the "defaultDS.instanceEnable" is «False» (no branch), then during step 504*d*, the UE 300 checks the status of the RAN synchronization. If it is "ON" (yes branch at step 504*d*), then during step 508*d*, the time synchronization control message is created or generated to stop or deactivate or disable the time synchronization process in the RAN between the UE 300 and the gNB 200. If the RAN synchronization is "OFF" (no branch at step 504*d*) then there is no need send a time synchronization control message, and the UE 300 goes to the end step 510*d*.

Step 505*d* comprises checking both the RAN PDC state at the UE 300 and the port information "PTP Profile" (Precision Time Protocol Profile) of the received synchronization notification PMIC message. If the RAN PDC state is "ON" and "PTP profile" points to a less demanding PTP profile like "Default Delay Request-Response" profile, then the PDC must be stopped. On the other hand, if the PDC state is OFF and "PTP profile" points to a more stringent profile like "802.1AS" profile then the PDC must be started. The PTP profiles are defined in IEEE Std 1588-2019 clause 20.3.3. Each PTP profile defines a set of parameters for instance to support more or less stringent application in terms of synchronization accuracy. In other words, the need of PDC (e.g. whether PDC should be active or inactive and so depending on the current state of PDC, whether it should be started/activated (to be active) or maintained in an active state or stopped/deactivated (to be inactive) or maintained in an inactive state) may be determined based on the PTP profile parameter supplied by PMIC message.

During step 506*d*, the time synchronization control message is created or generated. The time synchronization control message generated by the UE 300 may be based on a MAC CE described below with reference to FIG. 11. With such a MAC CE time synchronization control message, at step 506*d*, the time synchronization field or flag (bit 8) of the time synchronization control message is set to enable or "ON". Since there has been a change in synchronization requirements, as determined at step 505*d*, if the RAN PDC state is inactive or "OFF", the path delay compensation (PDC) field or flag (bit 7) of the time synchronization control message is set to enable or "ON". Accordingly, if the RAN PDC state is active or "ON", the PDC field of the time synchronization control message is set to "OFF". The RAN PDC state at the UE 300 is changed to "ON" and the time synchronization control message is sent during step 509*d*. In another example, the time synchronization control message generated by the UE 300 may be based on an RRC message, such as an UEAssistance Information message as described below. For example, IE of the UEAssistance Information message may include a refTime-activation field for indicating whether the time synchronization process is to be active or inactive and pdc-Activation field for indicating whether the path delay compensation is to be active or inactive.

During step 507*d*, the time synchronization control message is created or generated. The time synchronization control message generated by the UE 300 may be based on a MAC CE described below with reference to FIG. 11. With such a MAC CE time synchronization control message, at step 507*d*, the time synchronization field or flag (bit 8) of the time synchronization control message is set to enable or "ON" and the RAN synchronization state at the UE 300 is set to active or "ON". If the port information "PTP Profile" points to a less demanding PTP profile like "Default Delay Request-Response" profile then the path delay compensation (PDC) field or flag (bit 7) of the time synchronization control message is set to disable or "OFF" and the RAN PDC state at the UE 300 is set to inactive or "OFF". On the other hand, if "PTP profile" points to a more stringent profile like the 802.1AS profile then both the PDC field of the time synchronization control message and RAN PDC state at the UE 300 are set to "ON". Then the time synchronization control message is sent at step 509*d*. In another example, the time synchronization control message generated by the UE 300 may be based on an RRC message, such as an UEAssistance Information message as described below. For example, IE of the UEAssistance Information message may include a refTime-activation field for indicating whether the time synchronization process is to be active or inactive and pdc-Activation field for indicating whether the path delay compensation is to be active or inactive.

During step 508*d*, the time synchronization control message is created or generated. The time synchronization control message generated by the UE 300 may be based on a MAC CE described below with reference to FIG. 11. With such a MAC CE time synchronization control message, at step 508*d*, both the time synchronization field or flag (bit 8) and the path delay compensation (PDC) field or flag (bit 7) of the time synchronization control message are set to "OFF" as well as both RAN synchronization and RAN PDC states at the UE 300. Then the time synchronization control message for stopping or deactivating or disabling the time synchronization process in the RAN between the UE 300 and gNB 200 is sent during step 509*d*.

In another example, the time synchronization control message generated by the UE 300 may be based on an RRC message, such as an UEAssistance Information message as described below. For example, IE of the UEAssistance Information message may include a refTime-activation field for indicating whether the time synchronization process is to be active or inactive and pdc-Activation field for indicating whether the path delay compensation is to be active or inactive.

In another example, a duration time value corresponding to the duration time for which the time synchronization process is to be active may be sent to the UE 300 along with the synchronization notification from the core network entity. Once the time synchronization process has been activated or started based on the synchronization notification, the deactivation of the time synchronization process may be done autonomously or automatically by the UE 300 after the duration time has expired without requiring a deactivation message to be sent from the SMF. For example, the duration time may be used to set a timer at the UE 300 and when the timer expires, the UE sends a time synchronization control message for stopping or deactivating or disabling the time synchronization process in the RAN between the UE 300 and gNB 200.

The gNB 200 receives the time synchronization control message from a UE 300. This time synchronization control message contains information for controlling a time synchronization process in the RAN between the UE and the base station. For example, the time synchronization control message may control activation or deactivation of the time synchronization process in RAN. The time synchronization control message may also control options or additional features of the time synchronization process such as whether path delay compensation is to be activated in addition to the main process of the time synchronization i.e. the sending of the reference time.

Figure 6A:
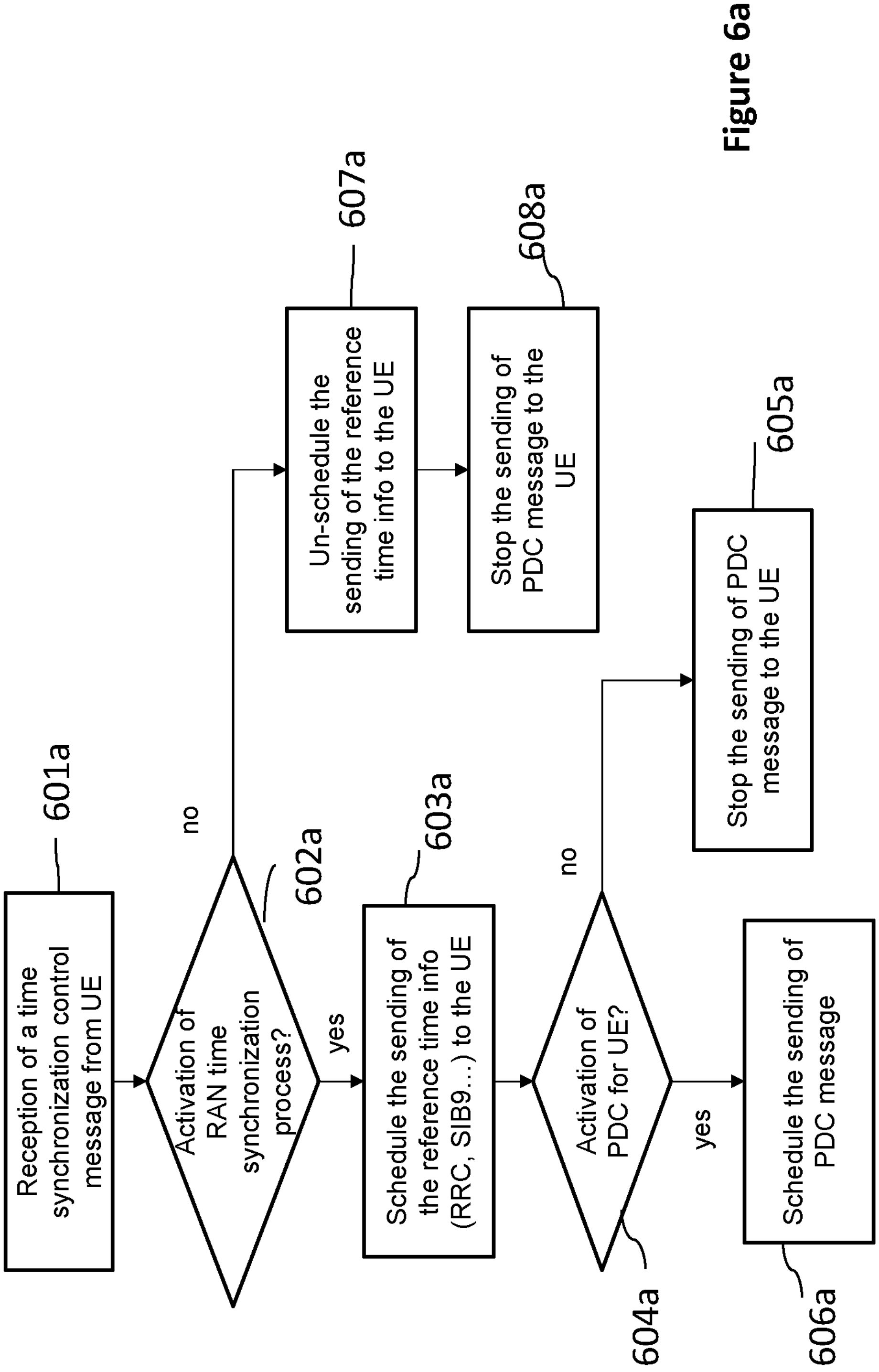
FIG. 6*a* illustrates a flow diagram of an example method, according to an embodiment, performed by the gNB when the reference time information is sent in unicast mode.

Referring now to FIG. 6*a*, which shows a flow diagram of an example method for controlling time synchronisation in a wireless network, according to an embodiment of the invention, which is performed by a gNB 200.

First at step 601*a*, the gNB 200 receives a time synchronization control message from a UE 300. The time synchronization control message may be a MAC CE message as described below with reference to FIG. 11 or a RRC message (such as an UEAssistance Information with information element dedicated to the time synchronization configuration and activation as described in the further description below or other RRC messages such as but not limited to RRC reconfiguration complete, RRC resume complete, RRC resume request message including time synchronization parameters similar to those described for the UEAssistance Information message).

As discussed above, the time synchronization control message may include at least a first field or time synchronization field for indicating whether the time synchronization process is to be active or inactive and may include a second field or PDC field for indicating whether the path delay compensation is to be active or inactive. For example, in the case where the time synchronization control message generated by the UE 300 is based on a MAC CE described below with reference to FIG. 11, such a MAC CE time synchronization control message includes a time synchronization field or flag (bit 8) and a path delay compensation field or flag (bit 7). For example, in the case where the time synchronization control message generated by the UE 300 is based on an UEAssistance Information message, the time synchronization control message includes a refTime-activation field for indicating whether the time synchronization process is to be active or inactive and pdc-Activation field for indicating whether the path delay compensation is to be active or inactive. Each field can be set to "ON" or "OFF". Then the gNB 200 parses the time synchronization control message to check whether the first field (e.g. time synchronization field) is set to "ON" (yes branch at step 602*a*). If the time synchronization field in the time synchronization control message is set to "ON", then at step 603*a*, the gNB 200 enables or activates the time synchronization process which results in the gNB 200 scheduling the sending of the reference time to the UE 300 which emits or sends the time synchronization control message. The reference time information is carried by RRC message (such as a DLInformationTransfer message) or SIB9 message (e.g. in a unicast message). The time synchronization control message (irrespective of whether it is a MAC CE message or a UE AssistanceInformation RRC message) may include additional fields which indicate a particular UE preference/configuration (e.g. unicast or broadcast, a certain periodicity of the sending of the reference time information, type of supported PDC (pre-compensation, RTT, TA, etc.) or the like) for the transmission by the gNB 200 of the reference time information (and PDC information if required). The gNB 200 may send the reference time information to the UE 300 based on information in the additional fields in the time synchronization control message.

Otherwise if the time synchronization field is set to "OFF" (no branch at step 602*a*), at step 607*a*, the gNB 200 disables or deactivates the time synchronization process which results in the gNB 200 disabling or deactivating the sending of the reference time information to the UE 300 and at step 608*a*, stop (if PDC is active) the sending of PDC message for the UE 300.

After step 603*a*, the gNB 200 checks whether the PDC field or flag is set to ON (step 604*a*). If the PDC field or flag is set to "ON" in the time synchronization control message (yes branch at step 604*a*), the gNB 200 starts the process to compute the path delay value between the UE and itself and schedules the sending to the UE 300 of the path delay compensation message including the path delay value or information representative of the path delay value (step 606*a*).

If the PDC field or flag is set to "OFF" (no branch at step 604*a*), the gNB 200 stops sending the path delay compensation message to the UE if the PDC was formerly "ON" (step 605*a*).

Figure 6B:
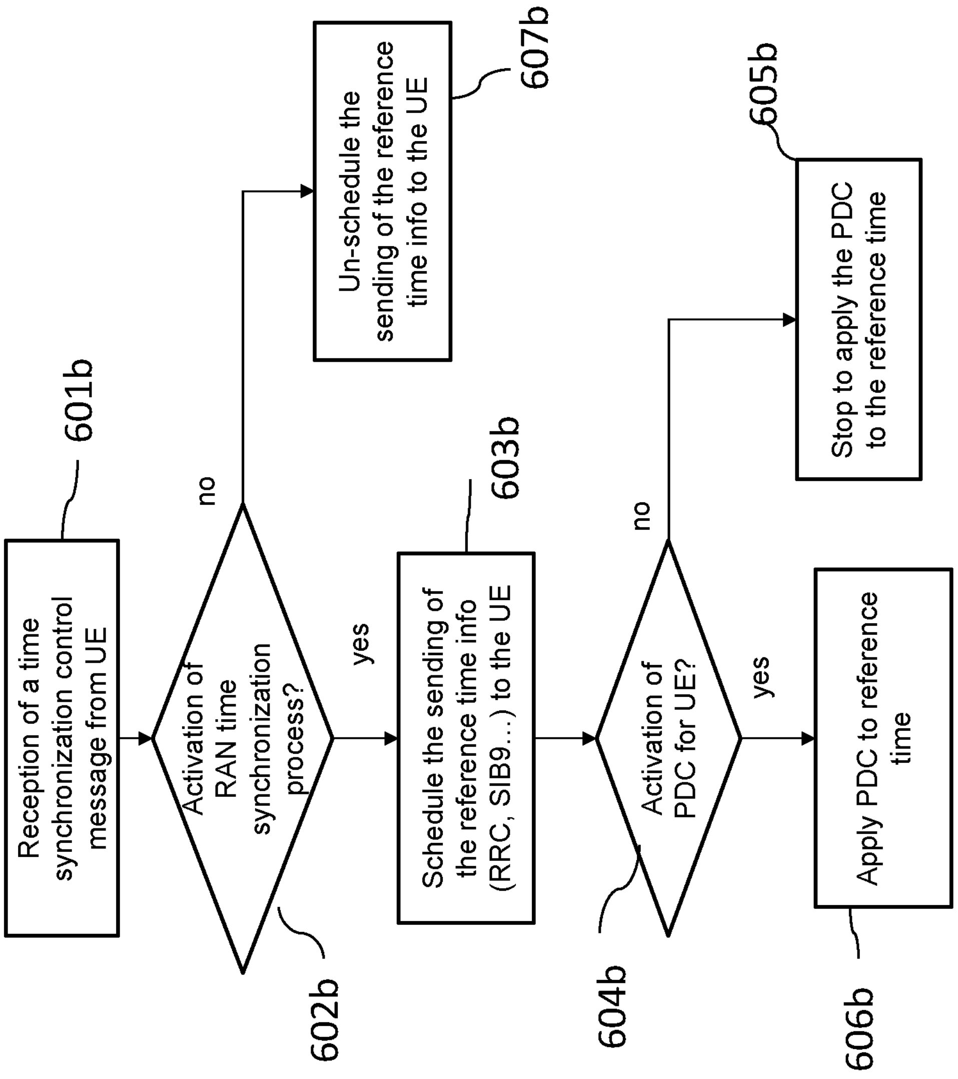
FIG. 6*b* illustrates a flow diagram of an example method, according to an embodiment, performed by the gNB when the reference time information is sent in unicast mode and the path delay is compensated by the gNB.

Referring now to FIG. 6*b*, which shows a flow diagram of an example method for controlling time synchronisation in a wireless network, according to an embodiment of the invention, which is performed by a gNB 200.

In the case of the pre-compensation, the PDC is directly applied to the reference time by the gNB 200 before sending the reference time to the UE 300. As the pre-compensation considers a propagation delay that may be different for different UEs, pre-compensation is utilized when the reference time is to be sent to one UE (e.g. in a unicast message).

First at step 601*b*, the gNB 200 (e.g. the UE synchronization manager 201 of the gNB) receives a time synchronization control message from a UE 300.

Then the gNB 200 parses the time synchronization control message to check whether the time synchronization field or flag is set to "ON" (yes branch at step 602*b*). If the time synchronization field or flag in the time synchronization control message is set to "ON", the gNB 200 schedules the sending of the reference time to the UE 300 which emits the time synchronization control message (step 603*b*). The reference time information is carried by RRC message (such as a DLInformationTransfer message) or SIB9 message. The time synchronization control message (irrespective of whether it is a MAC CE message or an UE AssistanceInformation RRC message) may include additional fields which indicate a particular UE preference/configuration (e.g. unicast or broadcast, a certain periodicity of the sending of the reference time information, type of supported PDC (pre-compensation, RTT, TA, etc.) or the like) for the transmission by the gNB 200 of the reference time information (and PDC information if required). The gNB 200 may send the reference time information to the UE 300 based on information in the additional fields in the time synchronization control message. If the UE only supports pre-compensation as PDC type, the gNB has to apply pre-compensation.

Otherwise, if the time synchronization is set to "OFF" (no branch at step 602*b*), the gNB 200 disables the sending of the reference time information to the UE 300 (step 607*b*).

After step 603*b*, the gNB 200 checks whether the PDC field or flag is set to "ON" (step 604*b*). If the PDC field or flag is set to "ON" in the time synchronization control message, the gNB 200 starts the process to compute the path delay value between the UE 300 and itself and applies the path delay value to the reference time (at step 606*b*).

For example, the gNB may compute the path delay value or the propagation delay value using the last calculated and sent TA and the following formula:

$(T_{TA}-Tc*N_{TA,offset})/2$, where $T_{TA}$ is the timing advance between downlink and uplink frames and $T_C$ is the Basic time unit for the New Radio as defined in TS 38.211, clause 4.1. Indeed, $T_{TA}$ is continuously determined by the gNB, which then calculates TA to be sent within a TA command. Thus, the determining of the compensated reference time is performed after the sending of a TA command by the gNB. The gNB determines the compensated reference time, by adjusting (sum) the reference time with the calculated path delay value.

If the PDC field or flag is set to "OFF" (no branch at step 604*b*), the gNB 200 stops the process to compute the path delay and stops to apply the path delay to the reference time information if the PDC process was formerly "ON" (step 605*b*).

In an alternate example, instead of disabling completely the sending of the reference time information to the UE at step 607*b*, the gNB 200 may not completely disable the sending of the reference time but may, for example, decrease the periodicity of the sending of the reference time information to the UE 300.

Figure 6C:
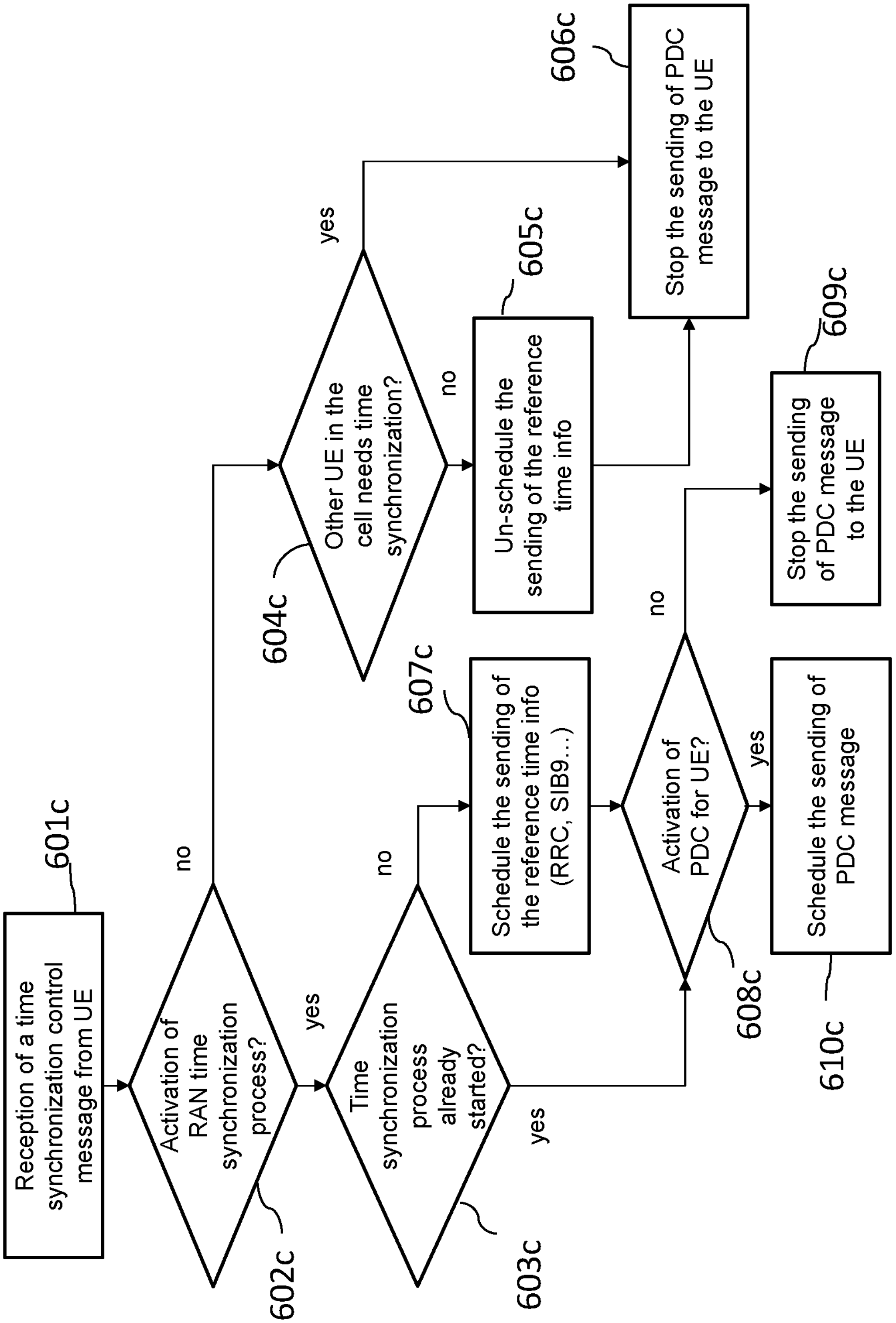
FIG. 6*c* illustrates a flow diagram of an example method, according to an embodiment, performed by the gNB when the reference time information is sent in broadcast mode.

Referring now to FIG. 6*c*, which shows a flow diagram of an example method for controlling time synchronisation in a wireless network, according to an embodiment of the invention, which is performed by a gNB 200.

In this example, the reference time is broadcasted to all the UEs in the cell, and so the gNB 200 has to check if there is no more UEs requiring the time synchronization process before disabling or deactivating the time synchronization process and stopping the sending of the reference time. As mentioned above, since the reference time is broadcast, the path delay pre-compensation cannot be used.

First at step 601*c*, the gNB 200 receives a time synchronization control message from a UE 300. The message may be a MAC CE message as described with reference to FIG. 11 or a RRC message (UE Assistance Information with information element dedicated to the time synchronization configuration and activation as described in the further description).

Then, the gNB 200 parses the time synchronization control message to check whether the time synchronization field or flag is set to "ON" (step 602*c*). If the field or flag in the time synchronization control message is set to "ON", the gNB 200 executes another step (603*c*) to check whether the time synchronization process has already started.

If the time synchronization has not started yet (no branch at step 603*c*), the gNB 200 schedules the sending of the reference time (step 607*c*). The reference time information is broadcasted in a RRC message or SIB9 message. Then step 608*c* is executed as described later. The time synchronization control message (irrespective of whether it is a MAC CE message or a UE AssistanceInformation RRC message) may include additional fields which indicate a particular UE preference/configuration (e.g. unicast or broadcast, a certain periodicity of the sending of the reference time information, type of supported PDC (pre-compensation, RTT, TA, etc.) or the like) for the transmission by the gNB 200 of the reference time information (and PDC information if required). The gNB 200 may send the reference time information to the UE 300 based on information in the additional fields in the time synchronization control message.

Now back to step 603*c*, if the time synchronization is already started (yes branch at step 603*c*), the gNB 200 goes directly to the step 608*c* and checks whether the PDC field or flag is set to "ON" in the time synchronization control message. If the PDC field or flag is set to "ON" in the time synchronization control message, the gNB 200 starts the process to compute the path delay value between the UE 300 and itself and, schedules the sending of the path delay compensation message including the path delay value or an information representative of the path delay value (step 610*c*).

If the PDC field or flag is set to "OFF" (no branch at step 608*c*), the gNB 200 stops to compute the path delay and stops to send the path delay message to the UE 300 if the PDC was formerly "ON" (step 609*c*).

Back to step 602*c*, if the time synchronization field or flag is set to "OFF" (no branch at step 602*c*), the gNB 200 executes another step (step 604*c*) to check whether at least one UE 300 in the cell needs time synchronization. If no UE in the cell needs time synchronization (no branch at step 604*c*), the gNB 200 deactivates the time synchronisation process which results in the disabling of the sending of the reference time information to the UE(s) in the cell at step 605*c* and stop (if PDC was formerly enabled) the sending of PDC message to the UE (step 606*c*). Otherwise, if at least one UE needs time synchronization, the gNB 200 only stop the PDC process for the UE which emits or sends the time synchronization control message (606*c*).

FIG. 11 illustrates an example MAC CE signaling frame format used as a time synchronization control message according to embodiments of the invention.

This signaling frame is sent either from UE 300 to gNB 200 or from gNB 200 to UE 300 as described herein.

The synchronization control message is compliant with the MAC CE format described in TS 38.321 clause 6.1.3. The LCID field is shown here as example, the MAC CE can also use the extended LCID field.

The MAC CE time synchronization control message includes at least a first field (e.g. the time synchronization field or flag (Time sync)) for indicating whether the time synchronization process is to be active or inactive. The Time sync field can be set to "ON" or "OFF" to start/activate/enable or stop/deactivate/disable the time synchronization process in the RAN.

The MAC CE time synchronization control message may further include at second field (e.g. the PDC field or flag) for indicating whether PDC is to be active or inactive. The PDC field shall be set to "OFF" if the Time sync field is "OFF", otherwise it can set to "ON" or "OFF" depending on whether the path delay compensation should be activated or not.

The MAC CE time synchronization control message may include additional fields which indicate a particular UE preference/configuration (e.g. unicast or broadcast, a certain periodicity of the sending of the reference time information, type of supported PDC (pre-compensation, RTT, TA, etc.) or the like) for the transmission by the gNB 200 of the reference time information (and PDC information if required).

In another example, the time synchronisation control message may be a RRC message such as an UEAssistance Information message with an Information Element (IE) for providing information for controlling the time synchronization process, such as time synchronization and PDC configuration and activation information. For example, the IE may include a first field (e.g. refTime-activation field) for indicating whether the time synchronization process is to be active or inactive and a second field (e.g. pdc-Activation field) for indicating whether PDC is to be active or inactive. The IE may include additional fields which indicate a particular UE preference/configuration (e.g. unicast or broadcast, a certain periodicity of the sending of the reference time information, type of supported PDC (pre-compensation, RTT, TA, etc.) or the like) for the transmission by the gNB 200 of the reference time information (and PDC information if required).

As stated in TS38.331 subclause 6.2.2., "The UEAssistanceInformation message is used for the indication of UE assistance information to the network."

For the purpose of configuring the time synchronization in the RAN (RAN synchronization) the UEAssistanceInformation-v17 information element (IE) is added, the information element contains the fields related to PDC and fields related to refTime (RAN synchronization).

For RAN synchronization, the UEAssistanceInformation-v17 IE contains the following fields:

refTime-activation can be either "ON" or "OFF" and instructs the gNB to start or stop synchronization to the radio network (e.g. activate/enable or deactivate/disable the time synchronization process at the UE or the gNB), referenceTimeInfo-Periodicity to inform gNB if the UE needs the reference time every value ms or only once and, the referenceTimeInfo-transfer can be either broadcast or unicast to inform gNB on the preference of the UE for the type of message to transport the reference time information.

For PDC, the UEAssistanceInformation-v17 IE contains the following fields:

"pdc-Activation" can be either "ON" or "OFF" and instructs the gNB to start or stop path delay compensation for the synchronization to the radio network (e.g. activate/enable or deactivate/disable PDC at the UE or the gNB), "pdc-Type" is an array that gives the type of pdc supported by the UE, each pdc-type is set to true if the UE supports this pdc type. For example: "pre-compensation" if path delay is applied by the gNB, "legacy-TA" if the path delay compensation scheme to be applied should follow the release 16 TA specifications, or it can be "enhanced-TA" if the path delay compensation scheme to be applied should follow the release 17 Timing Advance based specifications, or it can be "RTT" if the path delay compensation scheme to be applied should follow the release 17 Round Trip Time based specifications, "pdc-scenario" to inform the gNB in which scenario the UE is, such as control-to-control scenario/environment, power grid environment scenario/environment or the like, (this information may be obtained from the application layer) and used, for example, to determine if the PDC is required, and "pdc-periodicity" to inform gNB if the UE needs the pdc every value ms or only on demand.

Some other fields related to the synchronization may also be filled in: "Te-preference" can be either "ON" or "OFF" and instructs the gNB if UE should follow the timing error Te defined in release 16 or in release 17 (lower timing error) and "TA-granularity" to inform the gNB on the preferred TA granularity value (value of the step of correction of the TA). Te is the UE transmit timing error defined in TS 38.133, clause 7.1.2. The TA granularity is the step of correction applied to the TA command (discussed in more detail above and described in TS 38.211 clause 4.3.1) to obtain the path delay value. A configurable TA granularity allows an adaptation of the accuracy of the TA which is selected according to the type of usage (scenario), or type of message (e.g. a coarse granularity is selected for the absolute timing advance command MAC CE (TS38.321 clause 6.1.3.4a) and a finest granularity is selected for the Update TA command MAC CE (TS38.321 clause 6.1.3.4)). For more details on TA granularity, see also 3GPP document R2-2100941 submitted by Canon Research Centre France.

All or some of the above fields may be put in other RRC messages, such as RRC reconfiguration complete, RRC resume complete, or RRC resume request message.

The UEAssistanceInformation message is as follow (the added information element is in bold and mainly at the end):

UEAssistanceInformation message

```
-- ASN1START
-- TAG-UEASSISTANCEINFORMATION-START
UEAssistanceInformation ::=              SEQUENCE {
  criticalExtensions                       CHOICE {
    ueAssistanceInformation                    UEAssistanceInformation-IEs,
    criticalExtensionsFuture                   SEQUENCE { }
  }
}
UEAssistanceInformation-IEs ::=          SEQUENCE {
  delayBudgetReport                        DelayBudgetReport                      OPTIONAL,
  lateNonCriticalExtension                 OCTET STRING                           OPTIONAL,
  nonCriticalExtension                     UEAssistanceInformation-v1540-IEs      OPTIONAL
}
DelayBudgetReport::=                     CHOICE {
  type1                                    ENUMERATED {
                                               msMinus1280, msMinus640, msMinus320,
msMinus160,msMinus80, msMinus60, msMinus40,
                                               msMinus20, ms0, ms20,ms40, ms60, ms80, ms160,
ms320, ms640, ms1280},
  ...
}
UEAssistanceInformation-v1540-IEs ::= SEQUENCE {
  overheatingAssistance                    OverheatingAssistance                  OPTIONAL,
  nonCriticalExtension                     UEAssistanceInformation-v1610-IEs      OPTIONAL
}
OverheatingAssistance ::=                SEQUENCE {
  reducedMaxCCs                            ReducedMaxCCs-r16                      OPTIONAL,
  reducedMaxBW-FR1                         ReducedMaxBW-FRx-r16                   OPTIONAL,
  reducedMaxBW-FR2                         ReducedMaxBW-FRx-r16                   OPTIONAL,
  reducedMaxMIMO-LayersFR1                 SEQUENCE {
    reducedMIMO-LayersFR1-DL                   MIMO-LayersDL,
    reducedMIMO-LayersFR1-UL                   MIMO-LayersUL
  } OPTIONAL,
  reducedMaxMIMO-LayersFR2                 SEQUENCE {
    reducedMIMO-LayersFR2-DL                   MIMO-LayersDL,
    reducedMIMO-LayersFR2-UL                   MIMO-LayersUL
  } OPTIONAL
}
ReducedAggregatedBandwidth ::= ENUMERATED {mhz0, mhz10, mhz20, mhz30, mhz40, mhz50, mhz60,
mhz80, mhz100, mhz200, mhz300, mhz400}
UEAssistanceInformation-v1610-IEs ::= SEQUENCE {
  idc-Assistance-r16                       IDC-Assistance-r16                     OPTIONAL,
  drx-Preference-r16                       DRX-Preference-r16                     OPTIONAL,
  maxBW-Preference-r16                     MaxBW-Preference-r16                   OPTIONAL,
  maxCC-Preference-r16                     MaxCC-Preference-r16                   OPTIONAL,
  maxMIMO-LayerPreference-r16              MaxMIMO-LayerPreference-r16            OPTIONAL,
  minSchedulingOffsetPreference-r16        MinSchedulingOffsetPreference-r16      OPTIONAL,
```

-continued

UEAssistanceInformation message

```
   releasePreference-r16                   ReleasePreference-r16                   OPTIONAL,
   sl-UE-AssistanceInformationNR-r16       SL-UE-AssistanceInformationNR-r16       OPTIONAL,
   referenceTimeInfoPreference-r16         BOOLEAN                                 OPTIONAL,
   nonCriticalExtension                    UEAssistanceInformation-v17xx-IEs       OPTIONAL
}
IDC-Assistance-r16 ::=                     SEQUENCE {
   affectedCarrierFreqList-r16                  AffectedCarrierFreqList-r16
OPTIONAL,
   affectedCarrierFreqCombList-r16              AffectedCarrierFreqCombList-r16
OPTIONAL,
   ...
}
AffectedCarrierFreqList-r16 ::= SEQUENCE (SIZE (1.. maxFreqIDC-r16)) OF AffectedCarrierFreq-
r16
AffectedCarrierFreq-r16 ::=                SEQUENCE {
   carrierFreq-r16                             ARFCN-ValueNR,
   interferenceDirection-r16                   ENUMERATED {nr, other, both, spare}
}
AffectedCarrierFreqCombList-r16 ::= SEQUENCE (SIZE (1..maxCombIDC-r16)) OF
AffectedCarrierFreqComb-r16
AffectedCarrierFreqComb-r16 ::=            SEQUENCE {
   affectedCarrierFreqComb-r16                SEQUENCE (SIZE (2..maxNrofServingCells)) OF ARFCN-
ValueNR   OPTIONAL,
   victimSystemType-r16                       VictimSystemType-r16
}
VictimSystemType-r16 ::=                  SEQUENCE {
   gps-r16                                 ENUMERATED {true}                OPTIONAL,
   glonass-r16                             ENUMERATED {true}                OPTIONAL,
   bds-r16                                 ENUMERATED {true}                OPTIONAL,
   galileo-r16                             ENUMERATED {true}                OPTIONAL,
   navIC-r16                               ENUMERATED {true}                OPTIONAL,
   wlan-r16                                ENUMERATED {true}                OPTIONAL,
   bluetooth-r16                           ENUMERATED {true}                OPTIONAL,
   ...
}
DRX-Preference-r16 ::=                     SEQUENCE {
   preferredDRX-InactivityTimer-r16              ENUMERATED {
                                                    ms0, ms1, ms2, ms3, ms4, ms5, ms6, ms8, ms10,
ms20, ms30, ms40, ms50, ms60, ms80,
                                                    ms100, ms200, ms300, ms500, ms750, ms1280, ms1920,
ms2560, spare9, spare8,
                                                    spare7, spare6, spare5, spare4, spare3, spare2,
spare1} OPTIONAL,
   preferredDRX-LongCycle-r16                 ENUMERATED {
                                                    ms10, ms20, ms32, ms40, ms60, ms64, ms70, ms80,
ms128, ms160, ms256, ms320, ms512,
                                                    ms640, ms1024, ms1280, ms2048, ms2560, ms5120,
ms10240, spare12, spare11, spare10,
                                                    spare9, spare8, spare7, spare6, spare5, spare4,
spare3, spare2, spare1 } OPTIONAL,
   preferredDRX-ShortCycle-r16                ENUMERATED {
                                                    ms2, ms3, ms4, ms5, ms6, ms7, ms8, ms10, ms14,
ms16, ms20, ms30, ms32,
                                                    ms35, ms40, ms64, ms80, ms128, ms160, ms256,
ms320, ms512, ms640, spare9,
                                                    spare8, spare7, spare6, spare5, spare4, spare3,
spare2, spare1 } OPTIONAL,
   preferredDRX-ShortCycleTimer-r16           INTEGER (1..16)                    OPTIONAL
}
MaxBW-Preference-r16 ::=                   SEQUENCE {
   reducedMaxBW-FR1-r16                       ReducedMaxBW-FRx-r16                   OPTIONAL,
   reducedMaxBW-FR2-r16                       ReducedMaxBW-FRx-r16                   OPTIONAL
}
MaxCC-Preference-r16 ::=                   SEQUENCE {
   reducedMaxCCs-r16                          ReducedMaxCCs-r16                      OPTIONAL
}
MaxMIMO-LayerPreference-r16 ::=            SEQUENCE {
   reducedMaxMIMO-LayersFR1-r16               SEQUENCE {
      reducedMIMO-LayersFR1-DL-r16                 INTEGER (1..8),
      reducedMIMO-LayersFR1-UL-r16                 INTEGER (1..4)
   } OPTIONAL,
   reducedMaxMIMO-LayersFR2-r16               SEQUENCE {
      reducedMIMO-LayersFR2-DL-r16                 INTEGER (1..8),
      reducedMIMO-LayersFR2-UL-r16                 INTEGER (1..4)
   } OPTIONAL
}
MinSchedulingOffsetPreference-r16 ::= SEQUENCE {
```

-continued

UEAssistanceInformation message

```
   preferredK0-r16                      SEQUENCE {
      preferredK0-SCS-15kHz-r16            ENUMERATED {sl1, sl2, sl4, sl6}
OPTIONAL,
      preferredK0-SCS-30kHz-r16            ENUMERATED {sl1, sl2, sl4, sl6}
OPTIONAL,
      preferredK0-SCS-60kHz-r16            ENUMERATED {sl2, sl4, sl8, sl12}
OPTIONAL,
      preferredK0-SCS-120kHz-r16           ENUMERATED {sl2, sl4, sl8, sl12}
OPTIONAL
   }
OPTIONAL,
   preferredK2-r16                      SEQUENCE {
      preferredK2-SCS-15kHz-r16            ENUMERATED {sl1, sl2, sl4, sl6}
OPTIONAL,
      preferredK2-SCS-30kHz-r16            ENUMERATED {sl1, sl2, sl4, sl6}
OPTIONAL,
      preferredK2-SCS-60kHz-r16            ENUMERATED {sl2, sl4, sl8, sl12}
OPTIONAL,
      preferredK2-SCS-120kHz-r16           ENUMERATED {sl2, sl4, sl8, sl12}
OPTIONAL
   }                                                                   OPTIONAL
}
ReleasePreference-r16 ::=             SEQUENCE {
   preferredRRC-State-r16               ENUMERATED {idle, inactive, connected, outOfConnected}
}
ReducedMaxBW-FRx-r16 ::=              SEQUENCE {
   reducedBW-DL-r16                     ReducedAggregatedBandwidth,
   reducedBW-UL-r16                     ReducedAggregateBandwidth
}
ReducedMaxCCs-r16 ::=                 SEQUENCE {
   reducedCCsDL-r16                     INTEGER (0..31),
   reducedCCsUL-r16                     INTEGER (0..31)
}
SL-UE-AssistanceInformationNR-r16 ::= SEQUENCE (SIZE (1..maxNrofTrafficPattern-r16)) OF SL-
TrafficPatternInfo-r16
SL-TrafficPatternInfo-r16::=            SEQUENCE {
   trafficPeriodicity-r16                  ENUMERATED {ms20, ms50, ms100, ms200, ms300, ms400,
ms500, ms600, ms700, ms800, ms900, ms1000},
   timingOffset-r16                        INTEGER (0..10239),
   messageSize-r16                         BIT STRING (SIZE (8)),
   sl-QoS-FlowIdentity-r16                 SL-QoS-FlowIdentity-r16
}
UEAssistanceInformation-v17xx-IEs ::= SEQUENCE {
   pdc-Preference-r17                   PDC-Preference-r17                 OPTIONAL,
   referenceTime-Preference-r17         REFTime-Preference-r17             OPTIONAL,
   Te-Preference-r17                    BOOLEAN                            OPTIONAL,
   TA-granularity-r17                   ENUMERATED {value}                 OPTIONAL,
   nonCriticalExtension                 SEQUENCE { }                       OPTIONAL
}
PDC-Preference-r17 ::=                  SEQUENCE {
   pdc-Activation-r17                     BOOLEAN                        OPTIONAL,
   pdc-Type-r17                           PDC-Type-r17                   OPTIONAL,
   pdc-Scenario-r17                       ENUMERATED {
                                             Control-to-Control, powergrid, ...]OPTIONAL,
   pdc-Periodicity-r17                    ENUMERATED {value, onDemand}   OPTIONAL,
   ...
}
PDC-Type-r17 ::= SEQUENCE {
   pre-compensation             ENUMERATED {true}                  OPTIONAL,
   RTT                          ENUMERATED {true}                  OPTIONAL,
   legacy-TA                    ENUMERATED {true}                  OPTIONAL,
   enhanced-TA                  ENUMERATED {true}                  OPTIONAL,
...
}
REFTime-Preference-r17 ::= SEQUENCE {
   refTime-activation-r17          BOOLEAN                            OPTIONAL,
   referenceTimeInfo-Periodicity   ENUMERATED {value, once}           OPTIONAL,
   referenceTime-infoTransfer      ENUMERATED {Broadcast, Unicast}    OPTIONAL,
...
}
-- TAG-UEASSISTANCEINFORMATION-STOP
-- ASN1STOP
```

In another example, the time synchronisation control message may be a RRC reconfiguration message with an Information Element (JE) for providing information for controlling the time synchronization process, such as time synchronization and PDC configuration and activation information.

As stated in TS 38.311 clause 6.2.2, "The RRCReconfiguration message is the command to modify an RRC connection. It may convey information for measurement configuration, mobility control, radio resource configuration (including RBs, MAC main configuration and physical channel configuration) and AS security configuration".

For the purpose of configuring the RAN synchronization, the RRCReconfiguration-v17 information element is added. The IE may include a first field (e.g. RAN_synchronization field) for indicating whether the time synchronization process is to be active or inactive and a second field (e.g. RAN_pdc field) for indicating whether PDC is to be active or inactive. The RAN_synchronization field can be either "ON" or "OFF" and instructs the UE to start or stop synchronization to the radio network. The RAN_pdc field can also be either "ON" or "OFF" and instructs the UE to start or stop path delay compensation for the synchronization to the radio network. Finally, the IE may include a third field (e.g. RAN_pdc_type) for indicating the type of path delay compensation scheme to be applied. For example, this RAN_pdc_type field can be R16 if the path delay compensation scheme to be applied should follow the release 16 specifications, or it can be R17_TA if the path delay compensation scheme to be applied should follow the release 17 Timing Advance based specifications, or it can be R17_RTT if the path delay compensation scheme to be applied should follow the release 17 Round Trip Time based specifications.

The RRCReconfiguration message is as follow (the added information element is at the end):

RRCReconfiguration message

```
-- ASN1START
-- TAG-RRCRECONFIGURATION-START
RRCReconfiguration ::=                SEQUENCE {
   rrc-TransactionIdentifier             RRC-TransactionIdentifier,
   criticalExtensions                    CHOICE {
      rrcReconfiguration                    RRCReconfiguration-IEs,
      criticalExtensionsFuture              SEQUENCE { }
   }
}
RRCReconfiguration-IEs ::=            SEQUENCE {
   radioBearerConfig                     RadioBearerConfig
OPTIONAL, -- Need M
   secondaryCellGroup                    OCTET STRING (CONTAINING CellGroupConfig)
OPTIONAL, -- Cond SCG
   measConfig                            MeasConfig
OPTIONAL, -- Need M
   lateNonCriticalExtension              OCTET STRING
OPTIONAL,
   nonCriticalExtension                  RRCReconfiguration-v1530-IEs
OPTIONAL
}
RRCReconfiguration-v1530-IEs ::=         SEQUENCE {
   masterCellGroup                       OCTET STRING (CONTAINING CellGroupConfig)
OPTIONAL, -- Need M
   fullConfig                            ENUMERATED {true}
OPTIONAL, -- Cond FullConfig
   dedicatedNAS-MessageList              SEQUENCE (SIZE(1..maxDRB)) OF DedicatedNAS-Message
OPTIONAL, -- Cond nonHO
   masterKeyUpdate                       MasterKeyUpdate
OPTIONAL, -- Cond MasterKeyChange
   dedicatedSIB1-Delivery                OCTET STRING (CONTAINING SIB1)
OPTIONAL, -- Need N
   dedicatedSystemInformationDelivery    OCTET STRING (CONTAINING SystemInformation)
OPTIONAL, -- Need N
   otherConfig                           OtherConfig
OPTIONAL, -- Need M
   nonCriticalExtension                  RRCReconfiguration-v1540-IEs
OPTIONAL
}
RRCReconfiguration-v1540-IEs ::=      SEQUENCE {
   otherConfig-v1540                     OtherConfig-v1540
OPTIONAL, -- Need M
   nonCriticalExtension                  RRCReconfiguration-v1560-IEs
OPTIONAL
}
RRCReconfiguration-v1560-IEs ::=      SEQUENCE {
   mrdc-SecondaryCellGroupConfig         SetupRelease { MRDC-SecondaryCellGroupConfig }
OPTIONAL, -- Need M
   radioBearerConfig2                    OCTET STRING (CONTAINING RadioBearerConfig)
OPTIONAL, -- Need M
   sk-Counter                            SK-Counter
OPTIONAL, -- Need N
   nonCriticalExtension                  RRCReconfiguration-v1610-IEs
OPTIONAL
}
RRCReconfiguration-v1610-IEs ::=      SEQUENCE {
```

-continued

RRCReconfiguration message

```
  otherConfig-v1610                      OtherConfig-v1610
OPTIONAL, -- Need M
  bap-Config-r16                         SetupRelease { BAP-Config-r16 }
OPTIONAL, -- Need M
  iab-IP-AddressConfigurationList-r16    IAB-IP-AddressConfigurationList-r16
OPTIONAL, -- Need M
  conditionalReconfiguration-r16         ConditionalReconfiguration-r16
OPTIONAL, -- Need M
  daps-SourceRelease-r16                 ENUMERATED {true}
OPTIONAL, -- Need N
  t316-r16                               SetupRelease {T316-r16}
OPTIONAL, -- Need M
  needForGapsConfigNR-r16                SetupRelease {NeedForGapsConfigNR-r16}
OPTIONAL, -- Need M
  onDemandSIB-Request-r16                SetupRelease { OnDemandSIB-Request-r16 }
OPTIONAL, -- Need M
  dedicatedPosSysInfoDelivery-r16        OCTET STRING (CONTAINING PosSystemInformation-r16-
IEs)      OPTIONAL, -- Need N
  sl-ConfigDedicatedNR-r16               SetupRelease {SL-ConfigDedicatedNR-r16}
OPTIONAL, -- Need M
  sl-ConfigDedicatedEUTRA-Info-r16       SetupRelease {SL-ConfigDedicatedEUTRA-Info-r16}
OPTIONAL, -- Need M
  targetCellSMTC-SCG-r16                 SSB-MTC
OPTIONAL, -- Need S
  nonCriticalExtension                   SEQUENCE { }
OPTIONAL
}
MRDC-SecondaryCellGroupConfig ::=      SEQUENCE {
  mrdc-ReleaseAndAdd                     ENUMERATED {true}
OPTIONAL,   -- Need N
  mrdc-SecondaryCellGroup                CHOICE {
    nr-SCG                                 OCTET STRING (CONTAINING RRCReconfiguration),
    eutra-SCG                              OCTET STRING
  }
}
BAP-Config-r16 ::=                     SEQUENCE {
  bap-Address-r16                        BIT STRING (SIZE (10))
OPTIONAL, -- Need M
  defaultUL-BAP-RoutingID-r16            BAP-RoutingID-r16
OPTIONAL, -- Need M
  defaultUL-BH-RLC-Channel-r16           BH-RLC-ChannelID-r16
OPTIONAL, -- Need M
  flowControlFeedbackType-r16            ENUMERATED {perBH-RLC-Channel, perRoutingID, both}
OPTIONAL, -- Need R
  ...
}
MasterKeyUpdate ::=                    SEQUENCE {
  keySetChangeIndicator                BOOLEAN,
  nextHopChainingCount                 NextHopChainingCount,
  nas-Container                        OCTET STRING
OPTIONAL,   -- Cond securityNASC
  ...
}
OnDemandSIB-Request-r16 ::=              SEQUENCE {
  onDemandSIB-RequestProhibitTimer-r16     ENUMERATED {s0, s0dot5, s1, s2, s5, s10, s20,
s30}
}
T316-r16 ::=      ENUMERATED {ms50, ms100, ms200, ms300, ms400, ms500, ms600, ms1000,
ms1500, ms2000}
IAB-IP-AddressConfigurationList-r16 ::=  SEQUENCE {
  iab-IP-AddressToAddModList-r16         SEQUENCE (SIZE(1..maxIAB-IP-Address-r16)) OF IAB-IP-
AddressConfiguration-r16 OPTIONAL, -- Need N
  iab-IP-AddressToReleaseList-r16        SEQUENCE (SIZE(1..maxIAB-IP-Address-r16)) OF IAB-IP-
AddressIndex-r16       OPTIONAL, -- Need N
  ...
}
IAB-IP-AddressConfiguration-r16 ::=    SEQUENCE {
  iab-IP-AddressIndex-r16                IAB-IP-AddressIndex-r16,
  iab-IP-Address-r16                     IAB-IP-Address-r16
OPTIONAL,   -- Need M
  iab-IP-Usage-r16                       IAB-IP-Usage-r16
OPTIONAL,   -- Need M
  iab-donor-DU-BAP-Address-r16           BIT STRING (SIZE(10))
OPTIONAL,   -- Need M
...
}
SL-ConfigDedicatedEUTRA-Info-r16 ::=       SEQUENCE {
```

-continued

RRCReconfiguration message

```
  sl-ConfigDedicatedEUTRA-r16                    OCTET STRING
OPTIONAL,   -- Need M
  sl-TimeOffsetEUTRA-List-r16                    SEQUENCE (SIZE (8)) OF SL-TimeOffsetEUTRA-
r16         OPTIONAL   -- Need M
}
SL-TimeOffsetEUTRA-r16 ::=        ENUMERATED {ms0, ms0dot25, ms0dot5, ms0dot625, ms0dot75,
ms1, ms1dot25, ms1dot5, ms1dot75,
                                  ms2, ms2dot5, ms3, ms4, ms5, ms6, ms8, ms10,
ms20}
RRCReconfiguration-v17-IEs ::=            SEQUENCE {
  RAN_synchronization                     Enumerated{ON, OFF}
OPTIONAL, -- Need M
  RAN_pdc                                 Enumerated{ON, OFF}
                                          OPTIONAL, -- Need M
  RAN_PDC_Type                            enumerated{R16, R17_TA, R17_RTT}
OPTIONAL, -- Need M
}
-- TAG-RRCRECONFIGURATION-STOP
-- ASN1STOP
```

In a second embodiment, the base station (such as gNB 102 of FIG. 1 and gNB 200 of FIG. 2—it is noted that, for simplicity, only the reference numeral 200 will be used for the base station or gNB in the following) determines time synchronisation requirements between the UE (such as UE 104*a*, 104*b*, of FIG. 1, UE 300 of FIG. 3—it is noted that, for simplicity, only the reference numeral 300 will be used for the UE in the following) and the base station and generates a time synchronisation control message in response. For example, the gNB 200 determines whether time synchronisation is required or not or whether changes are required (such as activating or deactivating PDC) for an already active time synchronisation process. The gNB 200 may receive a message which triggers the creation of a time synchronization control message. The time synchronisation control message includes information for controlling the time synchronisation process, such as for activating or deactivating the time synchronisation process, or for changing an active time synchronisation process (e.g. changing options or additional features of the time synchronisation process), such as by activating or deactivating path delay compensation. In an example, the time synchronization control message contains a field controlling the activation/deactivation of the time synchronization process at the UE.

Figure 7A:
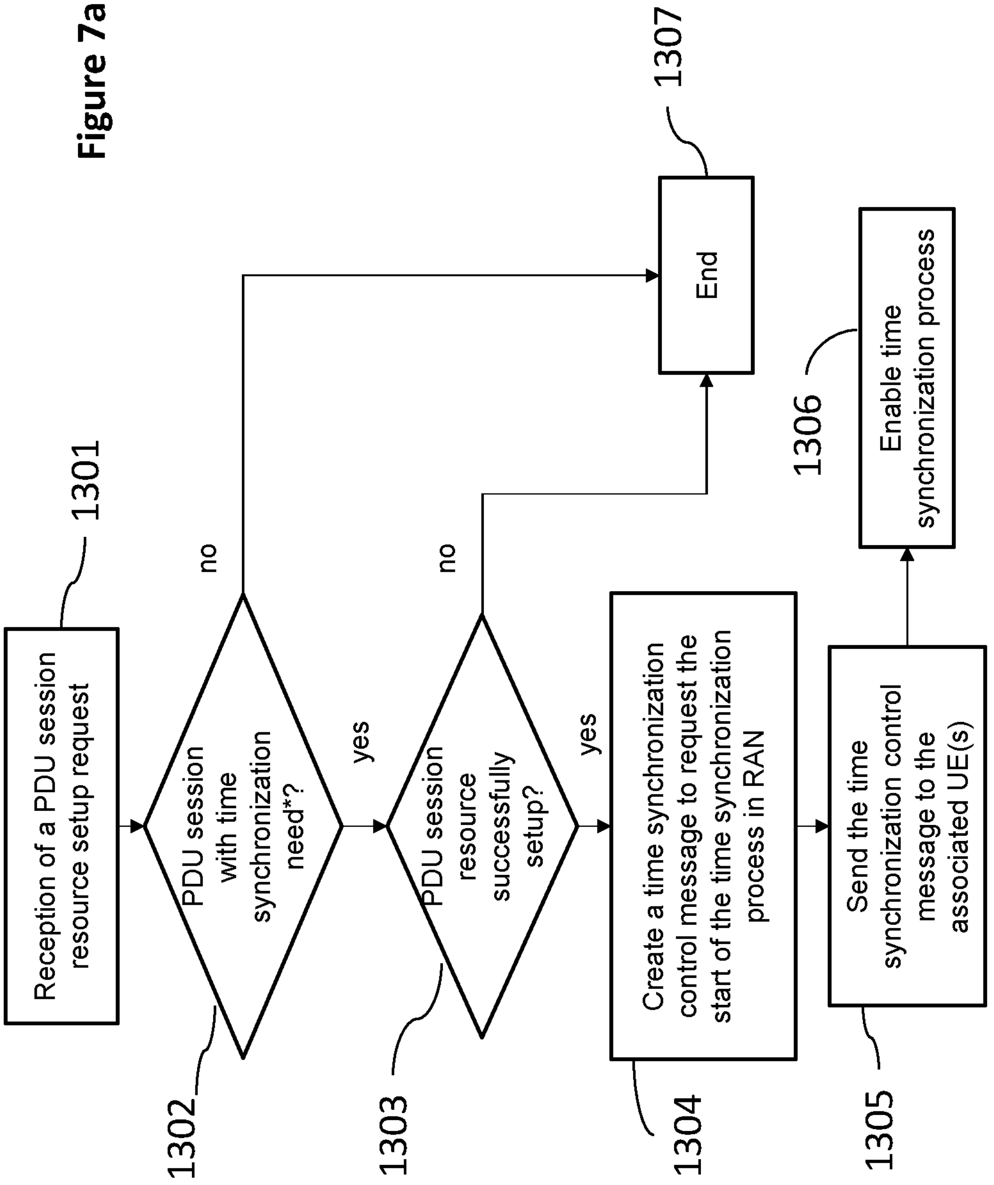
FIG. 7*a* illustrates a flow diagram of an example method, according to an embodiment, performed by the gNB when it is triggered by a PDU session establishment.

Referring now to FIG. 7*a*, which shows a flow diagram of an example method, according to an embodiment of the invention, which is performed by a gNB 200 when it is triggered by a PDU session resource set up.

First at step 1301, the gNB 200 receives a PDU SESSION RESOURCE SETUP REQUEST message (described in the TS38.413 subclause 9.2.1.1). The purpose of the PDU Session Resource Setup procedure is to assign resources on Uu and NG-U for one or several PDU sessions and the corresponding QoS flows, and to setup corresponding DRBs for a given UE. The PDU SESSION RESOURCE SETUP REQUEST is received from a core network entity, such as the Access and Mobility Management Function (AMF). This message contains all information required to setup the PDU session related to NG-RAN. In order to determine time synchronization requirements between the UE 300 and the gNB 200 a check is made at step 1302 as to whether this PDU session has some specific requirement in term of time synchronization (i.e. it does or does not require or need time synchronization and possibly if it does require or need time synchronization, with or without PDC). For instance, the PDU SESSION RESOURCE SETUP REQUEST message contains a PDU Session Resource Setup Request Transfer (TS38.413 clause 9.3.4.1) Information Element (IE) populated by SMF. This IE contains at least the QoS Flow Level QoS Parameters (9.3.1.12 in TS38.413) which points out the need for time synchronization for the RAN. The QoS parameters include the description of the Dynamic 5QI (also known as non-standardised or not pre-configured 5QI) Descriptor (9.3.1.18 in TS38.413) and the Non Dynamic 5QI (also known as standardised 5QI) Descriptor (9.3.1.28 in TS38.413). Those descriptors allow to define QoS parameters such as the 5QI for the Non-dynamic 5QI for which a correspondence exists between the 5QI value and the packet delay budget as defined in the table 5.7.4-1 in TS23.501. For the dynamic 5QI, the Packet Delay Budget and the Delay Critical parameters are directly accessible and may be specified independently from the 5QI value. For example, during step 1302, the gNB 200 determines the need or requirement for time synchronization if the 5QI value corresponds to a delay critical GBR (#82, #83, #84, #85) or other value, for example a new 5QI value in the Non-Dynamic 5QI, or for example a low Packet Delay Budget (<10 ms) or for delay critical QoS flow in the dynamic 5QI. The need for time synchronization can be determined if a PDU session is setup with GBR #82, or #83, or #84, or #85 QoS parameters.

Also, for step 1302, an optional parameter, the TSC (Time Sensitive Communication) QoS Flow Information Element (IE) may also be present in the PDU Session Resource Setup Request Transfer. This IE provides the traffic characteristics of TSC QoS flows through the TSC Assistance Information which includes information such as the traffic periodicity and the burst arrival time. The TSC Assistance information may include information to indicate the status of the NW-TT and DS-TT or more generally the status of the time synchronization process or service to inform the gNB 200. In addition, the TSC Assistance information may include a duration time value corresponding to the duration time for which the time synchronization process is to be active. Based on the presence of the TSC QoS Flow, the gNB 200 may consider the need of time synchronization. For example, at step 502*a*, based on the presence of the TSC QoS Flow, the gNB 200 may detect a Packet Data Unit, PDU, session for a Time Sensitive Communication (TSC).

In another example of implementation, the gNB 200 may use the Single Network Slice Selection Assistance Information (S-NSSAI clause 9.3.1.24 in TS 38.413) included in the PDU SESSION RESOURCE SETUP REQUEST message to make a determination, at step 1302, as to whether the PDU session has some specific requirement in term of time synchronisation (i.e. it requires or needs time synchronisation). The network slicing allows building several logical networks with different requirements on top of the same physical infrastructure. The identification of the network slice is done with the S-NSSAI. The S-NSSAI (as defined in clause 5.12.2.1 in TS 23.501) is made up of two fields: the SST for Slice Service Type which is mandatory and refers to the expected Network Slice behaviour in terms of features and services; and the SD Slice Differentiator which is an optional information that complements the Slice/Service type(s) to differentiate amongst multiple Network Slices of the same Slice/Service type. Currently, 5 different values of service are standardized as illustrated in the table 5.15.2.2-1 in TS 23.501. For example, to make a determination as to whether a Packet Data Unit, PDU, session for a Time Sensitive Communication (TSC) is detected, the gNB 200 checks the S-NSSAI value. If the S-NSSAI value corresponds to a value representative of a time synchronization need, the gNB 200 determines there is a requirement or need for time synchronization and then prepares a time synchronization control message to request the activation of the time synchronization process in the Radio Access Network (RAN). The S-NSSAI representative of a time synchronization need may be for example the usage of the SST value corresponding to the Ultra Reliable Low Latency Communication (SST value=2) or a new SST value for the Time Sensitive Communication amongst the unused value for standardized SST value (from 0 to 127); or one SST value in the range of the operator specific value (from 128 to 255) for a TSC services supported by dedicated operators; or using a particular SD value to particularize the current standardized services, for example SST value=2 for Ultra Reliable Low Latency Communication with a SD=1 for a Time Sensitive addon. The knowledge of the specific value for the Time Sensitive communication may be either standardized or shared during a preliminary procedure (as described in clause 5.15 in TS23.501).

The PDU SESSION RESOURCE SETUP REQUEST also contains a PDU session identity or identifier which is used to identify a PDU session. This PDU session ID is present in all messages to control the PDU session. When the PDU session is classified with a need for time synchronization (during step 1302), the gNB 200 also associates the PDU session identity with the need of time synchronization. Consequently, in the following PDU session procedure, the gNB 200 may know if the session is classified with a need or requirement for time synchronization only based on the PDU session identity.

Based on the previous characteristics, the gNB 200 considers in step 1302 a need of time synchronization and in case of the PDU session resource successfully setup (yes branch at step 1303), the gNB 200 creates a time synchronization control message to start the time synchronization process in the RAN (step 1304). Upon determination of the time synchronization need, the gNB sends a signaling message (e.g. time synchronization control message) to the UE to start the RAN time synchronization. In an example, the time synchronization control message contains a time synchronization field set to enable or "ON" and optionally a PDC field which is set to enable or "ON" in case of stringent synchronization requirement. The time synchronisation control message may be a MAC Control Element, MAC CE, message as described with reference to FIG. 11 for MAC CE. In another example, the time synchronization control message may be a RRC reconfiguration message as described above. Then in step 1305, the gNB 200 sends the time synchronization control message to the associated UE(s), for instance the UE identified in the RAN UE NGAP ID parameter (defined in the PDU SESSION RESOURCE SETUP REQUEST). And in step 1306, the gNB 200 enables or activates the time synchronization process i.e. starts to send the reference time and if the time synchronization control message includes a PDC field, starts the path delay computation according to the PDC status set in the PDC field of the time synchronization control message. Some UE preference, for example, the type of transport (unicast or broadcast), the periodicity of the sending of the reference time, the periodicity of the sending of the PDC information, may have been previously received at the gNB 200 from the UE 300 for instance via UE AssistanceInformation RRC message. These preferences allow the gNB 200 to adapt or change the time synchronization process performed at the gNB 200 according to the UE preference.

Otherwise, if there is no need of time synchronization (no branch at step 1302) or if the PDU session resource setup failed (no branch at step 1303), the gNB 200 goes to the end step 1307.

Figure 7B:
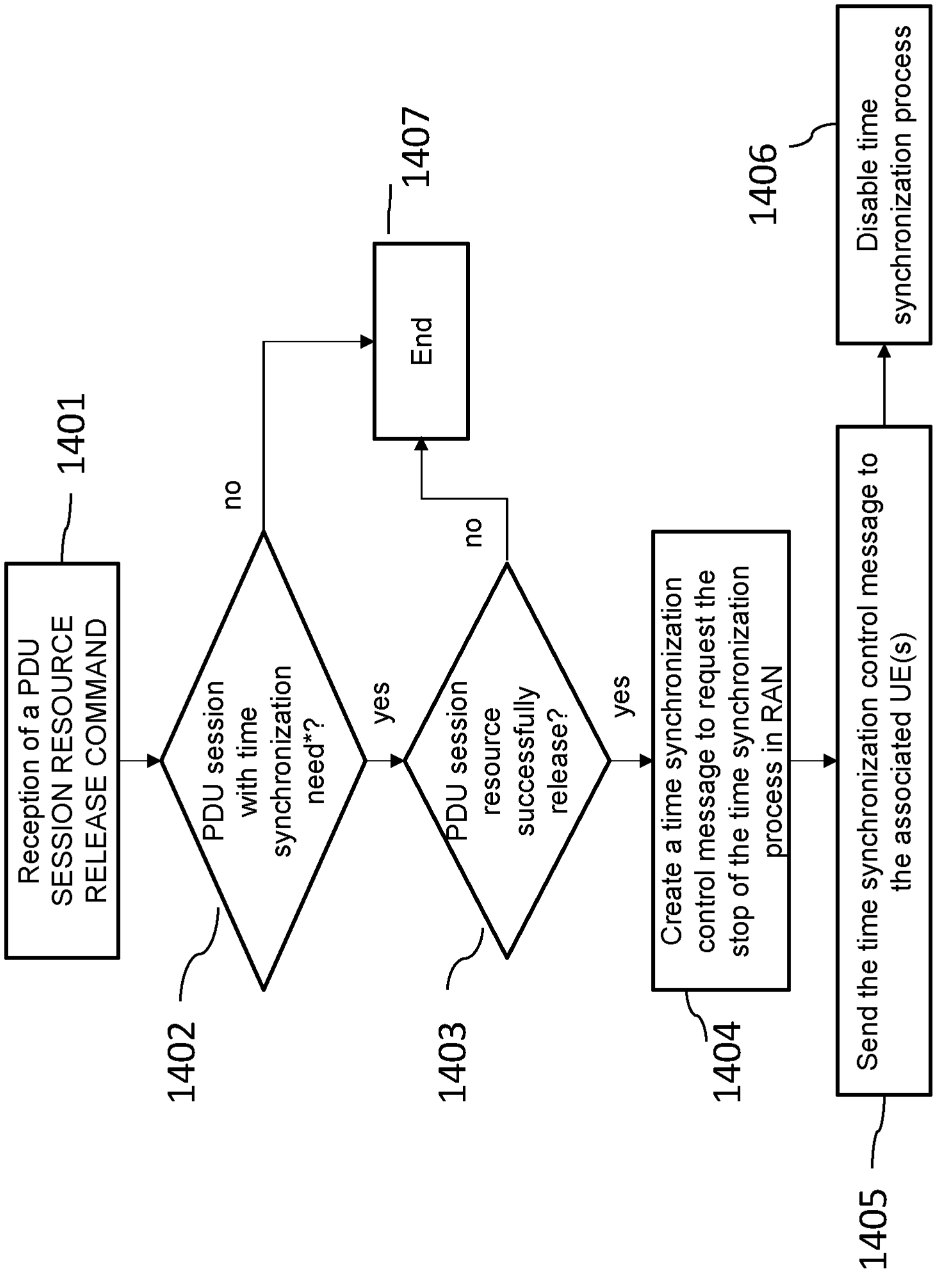
FIG. 7*b* illustrates a flow diagram of an example method, according to an embodiment, performed by the gNB when it is triggered by a PDU session release.

Referring now to FIG. 7*b*, which shows a flow diagram of an example method, according to an embodiment of the invention, which is performed by a gNB 200 when it is triggered by a PDU session resource release.

First at step 1401, the gNB 200 receives a release of a PDU session such as described in the TS38.413 section 8.2.2. A PDU SESSION RESOURCE RELEASE REQUEST is received from a core network entity, the Access and Mobility Management Function (AMF). The message mainly contains the cause of the release and the PDU session identity or identifier.

As explained above, the PDU session identity or identifier (ID) is used to identify a PDU session. Moreover, during the PDU session resource setup, the gNB 200 has associated the need of time synchronization to the PDU session ID (during step 1302). Thus, to check whether the PDU session for which the release has been requested is a PDU session with time synchronization needs or requirements, the gNB 200 uses the PDU session ID and verifies if the PDU session is flagged as requiring time synchronization (step 1402).

If the PDU session is identified as a session requiring or needing time synchronization, and if the PDU session resource is successfully released (yes branch at step 1403), the gNB 200 creates a time synchronization control message to stop or deactivate the time synchronization process in the RAN (step 1404).

Then, the gNB 200 sends the time synchronization control message to its associated UE 300 (at step 1405). Before disabling or deactivating the time synchronization, in step 1406, the gNB 200 checks whether other PDU sessions requiring time synchronization are always active. If there is no more active PDU sessions with time synchronization needed, the gNB 200 disables or deactivates the time synchronization process, at step 1406. In other words, the gNB 200 stops broadcasting the reference time and potentially stops the process related to the path delay compensation. Else, if at least one PDU session with time synchronization need is always active, the time synchronization remains enabled or active.

Otherwise, if the session is not a session with time synchronization (no branch at step 1402) or if the PDU session resource release failed (no branch at step 1403), the gNB goes to the end step 1407.

Figure 7C:
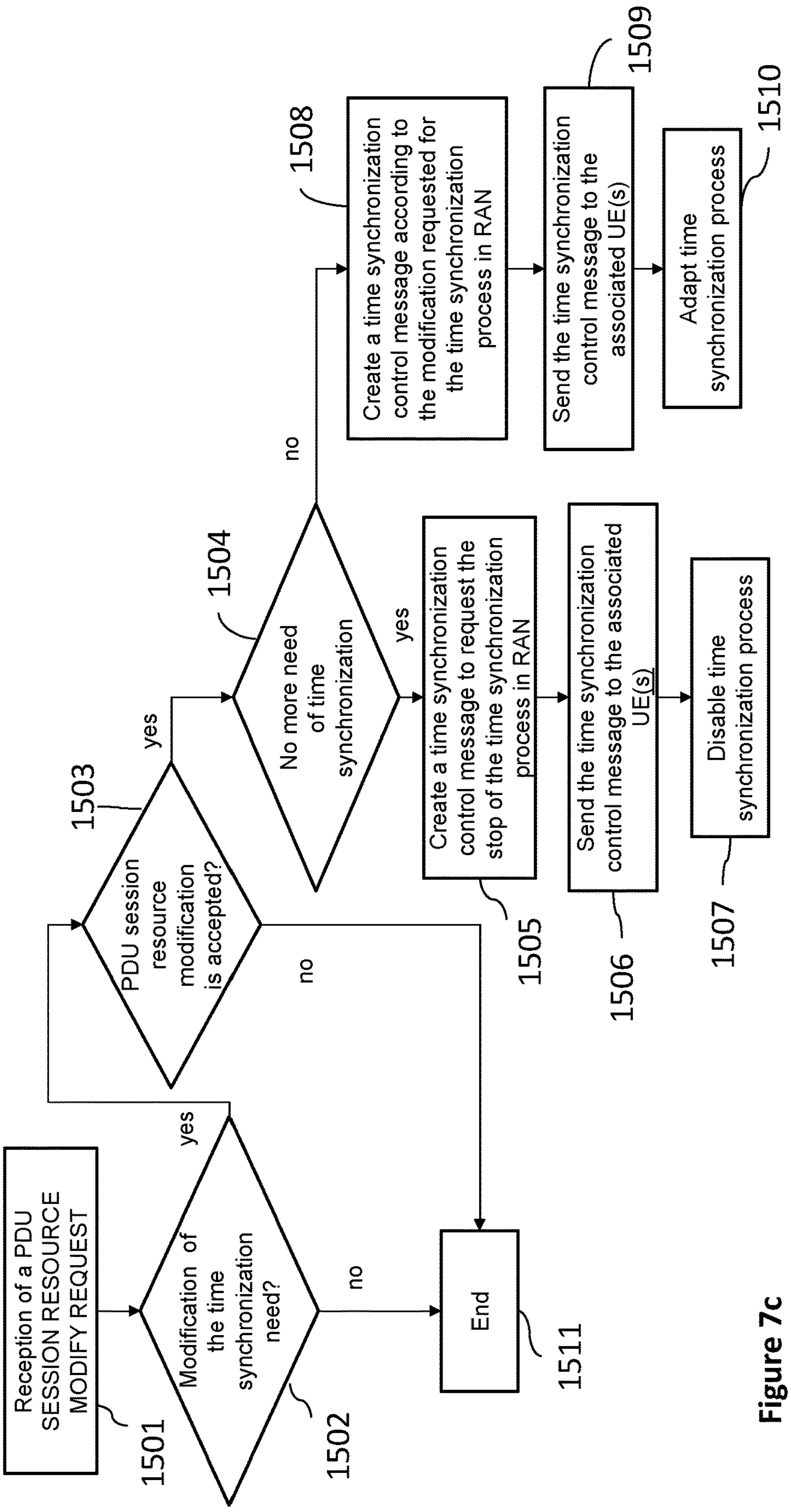
FIG. 7*c* illustrates a flow diagram of an example method, according to an embodiment, performed by the gNB when it is triggered by a PDU session modification.

Referring now to FIG. 7*c*, which shows a flow diagram of an example method, according to an embodiment of the invention, which is performed by a gNB 200 when it is triggered by a PDU session resource modification.

First at step 1501, the gNB 200 receives a modification of a PDU session resource (described in the TS38.413 subclause 8.2.3). A PDU SESSION RESOURCE MODIFY REQUEST is received from a core network entity, the Access and Mobility Management Function (AMF). As for the PDU SESSION RESOURCE SETUP REQUEST procedure, the message includes a QoS Flow Level QoS Parameters with the dynamic and Non-dynamic 5QI descriptors along with the TSC Traffic Characteristics (included in the PDU Session Resource Modify Request Transfer subclause 9.3.4.3 in TS 38.413). The message may include S-NSSAI for indicating whether the PDU session is linked to a network slice for TSC. Based on those parameters, the gNB 200 may check in step 1502, if the modification impacts the time synchronization requirements (i.e. whether the modified PDU session requires or needs time synchronization and possibly if the PDU session does require time synchronisation, whether the modified PDU session needs PDC or not). When the modification of the PDU session results in a modification of the time synchronization requirement or need (yes branch at step 1502) and if the PDU session resource modification is accepted (yes branch at step 1503), there are two different cases.

Case 1: The PDU session is modified from a PDU session with a time synchronization need to a PDU session without a time synchronization need (yes branch at step 1502, yes branch at step 1504). For instance, the 5QI may be modified from a value associated to a low Packet Delay Budget (e.g. 5QI #85 with a PDB=5 ms) to a value associated to a high Packet Delay Budget (e.g. 5QI #3 with a PDB=50 ms) i.e. the modified PDU session has no more need of time synchronization. In another example, the S-NSSAI value may be modified from a value associated to time sensitive communication (e.g. SST value=5 for ultra-reliable low latency communications or a new SST value=6 for Time Sensitive Communication) to a value without time synchronization requirement (e.g. SST value=1 for 5G enhanced Mobile Broadband) or a S-NNSAI value with existing SST value (e.g. SST=5 for ultra-reliable low latency communications) and from a SD representative of a time synchronization need to a SD value or no SD field in the message i.e. the PDU session has no more time synchronization requirement. In that case, the gNB 200 creates a time synchronization control message to request the stop or deactivation of the time synchronization process in RAN (step 1505). Then, the gNB 200 sends the time synchronization control message to its associated UE(s) (step 1506). Then before disabling the time synchronization process at step 1507, the gNB 200 checks whether other PDU sessions requiring time synchronization are always active. If there is no more active PDU sessions requiring time synchronisation, the gNB 200 disables or deactivates the time synchronization process (step 1507). Else, if at least one PDU session requiring time synchronization is always active, the time synchronization remains enabled or active.

Case 2: The PDU session is modified from a PDU session without time synchronization need to a PDU session requiring time synchronization or a PDU session with some adaptation of the time synchronization needs or requirements (yes branch at step 1502, no branch at step 1504). For instance, the TSC (Time Sensitive Communication) parameters are added in the PDU SESSION RESOURCE MODIFY REQUEST message while they were initially absent during the PDU session resource setup. In such a case, the gNB 200 will detect that the modified PDU session is a PDU session for a TSC and thus, requires time synchronization. In another example, the Packet Delay Budget value is dropped from 50 ms to 2 ms i.e. the modified PDU session has a need of time synchronization. In the last example, the PDU session is modified with a Packet Delay Budget which requires a time synchronization but with more stringent budget requirement. With a more stringent requirement, the time synchronization may require for instance path delay compensation in addition to main time synchronization process. In the other side, the modification may release the packet budget delay constraint (e.g. PDB from 2 ms to 15 ms) and as a result the path delay compensation may become useless and so not required.

In that case, in step 1508, the gNB 200 creates a time synchronization control message to reflect the requested modification. For instance, the gNB 200 requests to start the time synchronization process in RAN with path delay compensation. Then, at step 1509, the gNB 200 sends the time synchronization control message to its associated UE 300 and adapts its own synchronization process at step 1510 (e.g. starts broadcasting the reference time and if required perform path delay compensation for some UEs).

Otherwise, if there is no modification related of the time synchronization (no branch at step 1502) or if the PDU session resource modification failed (no branch at step 1503), the gNB 200 goes to the end step 1511.

In an alternate example, a monitoring of the QoS (QoS Monitoring Request field in QoS Flow Level QoS Parameters subclause 9.3.1.12 in TS 38.413) may be requested by the core network during the PDU session resource setup or PDU session resource modify. During the monitoring, the gNB 200 may detect that the time synchronization requirement is no longer achieved for some UEs and consequently in response may enable or activate the path delay compensation (if it is not yet enabled or active) by sending a time synchronization control message to those UEs. Thus, the gNB 200 may inform the core network of this modification of the QoS parameter with a PDU session resource notify.

Figure 7D:
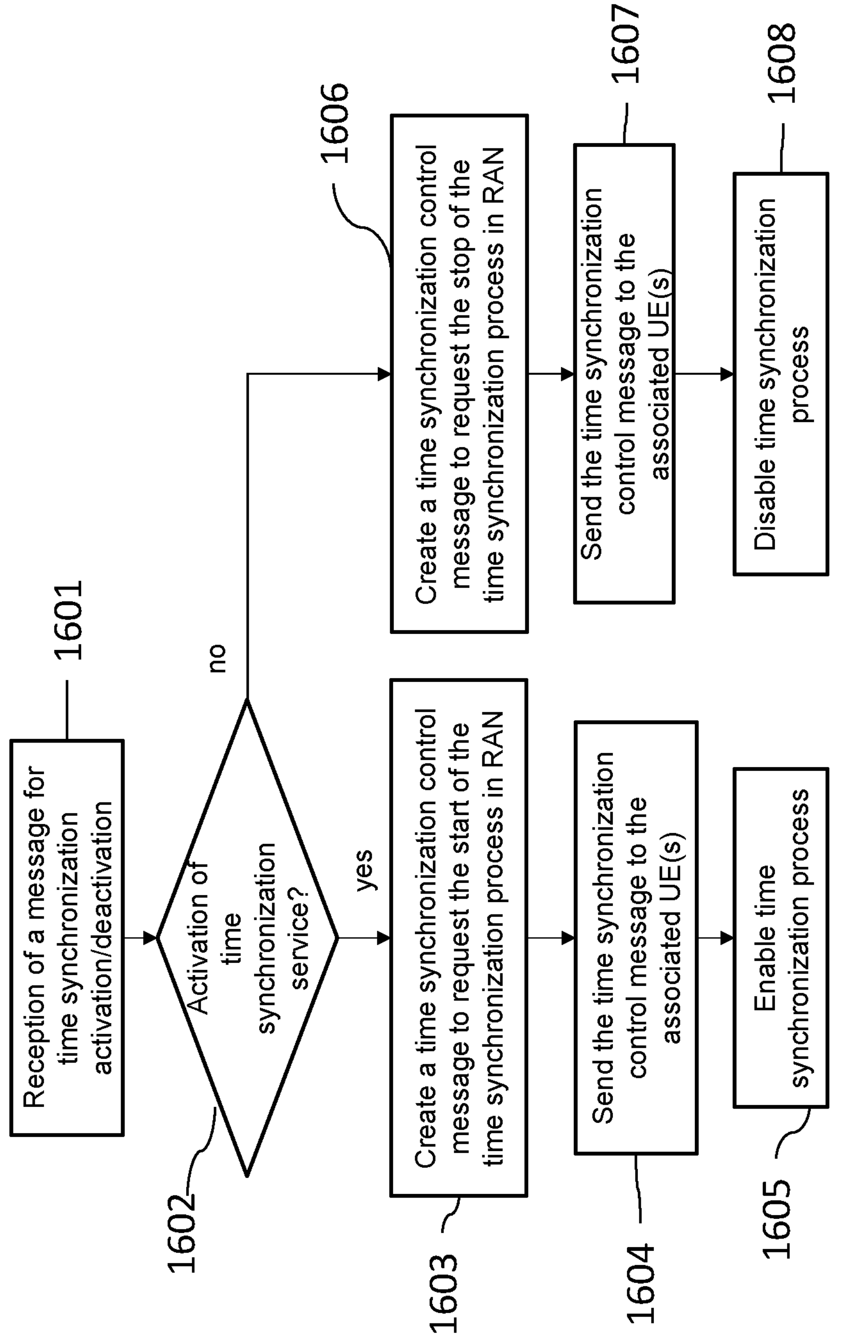
FIG. 7*d* illustrates a flow diagram of an example method, according to an embodiment, performed by the gNB when it is triggered by a SMF synchronization notification.

Referring now to FIG. 7*d*, which shows a flow diagram of an example method, according to an embodiment of the invention, which is performed by a gNB 200 when it is triggered by a synchronisation notification sent by a core network entity.

For each UE 300, the core network entity, SMF (Session Management Function), sends a start synchronization notification to the gNB 200. This synchronization notification is sent transparently to the gNB 200 across the AMF (Application Management Function). The format of this notification; is as follow:

```
AN_Synchronization_Notification-IEs ::=     SEQUENCE {
    RAN_UE_NGAP_ID                          INTEGER (0..2^32 -1), OPTIONAL, Need M
    RAN_synchronization                         Enumerated{ON, OFF}
OPTIONAL, -- Need M
```

-continued

| | |
|---|---|
| RAN_pdc | Enumerated{ON, OFF} OPTIONAL, -- Need M |
| RAN_PDC_Type OPTIONAL, -- Need M | enumerated{R16, R17_TA, R17_RTT} |

RAN_UE_NGAP_ID uniquely identifies the UE 300 that the gNB 200 should configure. Such identifier is described in TS 38.413 clause 9.3.3.1. If the identifier is equal 0xFFFFFFFF then all UEs known to the gNB should be configured.

RAN_synchronization can be either "ON" or "OFF" and instructs the gNB to start or stop (e.g. activate/enable or deactivate/disable) synchronization of the UE to the radio network.

RAN_pdc can be either "ON" or "OFF" and instructs the gNB to start or stop (e.g. activate/enable or deactivate/disable) path delay compensation for the UE synchronization to the radio network.

RAN_pdc_type can be R16 if the path delay compensation scheme to be applied should follow the release 16 specifications, and means the gNB 200 should mainly instruct the UE to start or activate/enable PDC.

RAN_pdc_type can be R17_TA if the path delay compensation scheme to be applied should follow the release 17 Timing Advance based specifications, means the gNB should instruct the UE to follow the same PDC scheme, and the gNB should start or activate/enable the related signaling including pre-compensation if needed.

RAN_pdc_type can be R17_RTT if the path delay compensation scheme to be applied should follow the release 17 Round Trip Time based specifications. The gNB actions are the same as described earlier.

During the first step 1601 the gNB 200 receives the synchronisation notification from the SMF.

Then during step 1602, the gNB 200 checks the RAN_synchronization field of the synchronization notification. If this field is set to "ON" (yes branch at step 1602), then during step 1603 the gNB 200 creates or generates a time synchronization control message (such as the MAC CE time synchronization control message as described with reference to FIG. 11) destined to the UE referred by the field RAN_UE_NGAP_ID with the Time sync field set to "ON" and the PDC field set to the same value as RAN_pdc field. In another example, the time synchronization control message may be sent as a RRC reconfiguration message as described above.

Then during step 1604 the time synchronization control message is sent to the referred UE.

During step 1605, the gNB 200 starts the time synchronization process by scheduling the sending of the reference time. The reference time information is sent in a RRC message or SIB9 message. The gNB 200 may also start the path delay compensation process as reflected by RAN_pdc and RAN_pdc_type fields.

Back to step 1602, if RAN_synchronization field is set to "OFF" (no branch at step 1602) then during step 1606 the gNB 200 creates or generates a time synchronization control message (such as the MAC CE time synchronization control message as described with reference to FIG. 8) destined to the UE referred by the field RAN_UE_NGAP_ID with the Time sync field set to "OFF" and the PDC field set to "OFF".

Then during step 1607 the time synchronization control message is sent to the referred UE.

During step 1608, the gNB 200 stops or disables the time synchronization process by disabling the sending of the reference time. The reference time information is sent in a RRC message or SIB9 message. The gNB 200 also stops or disables or deactivates the path delay compensation process.

In another example, a duration time value corresponding to the duration time for which the time synchronization process is to be active may be sent to the gNB 200 along with the synchronization notification from the core network entity, SMF. Once the time synchronization process has been activated or started based on the synchronization notification, the deactivation of the time synchronization process may be done autonomously or automatically by the gNB 200 after the duration time has expired without requiring a deactivation message to be sent from the SMF. For example, the duration time may be used to set a timer at the gNB 200 and when the timer expires, the gNB sends a time synchronization control message to the UE 300 for stopping or deactivating or disabling the time synchronization process in the RAN between the UE 300 and gNB 200.

Figure 8:
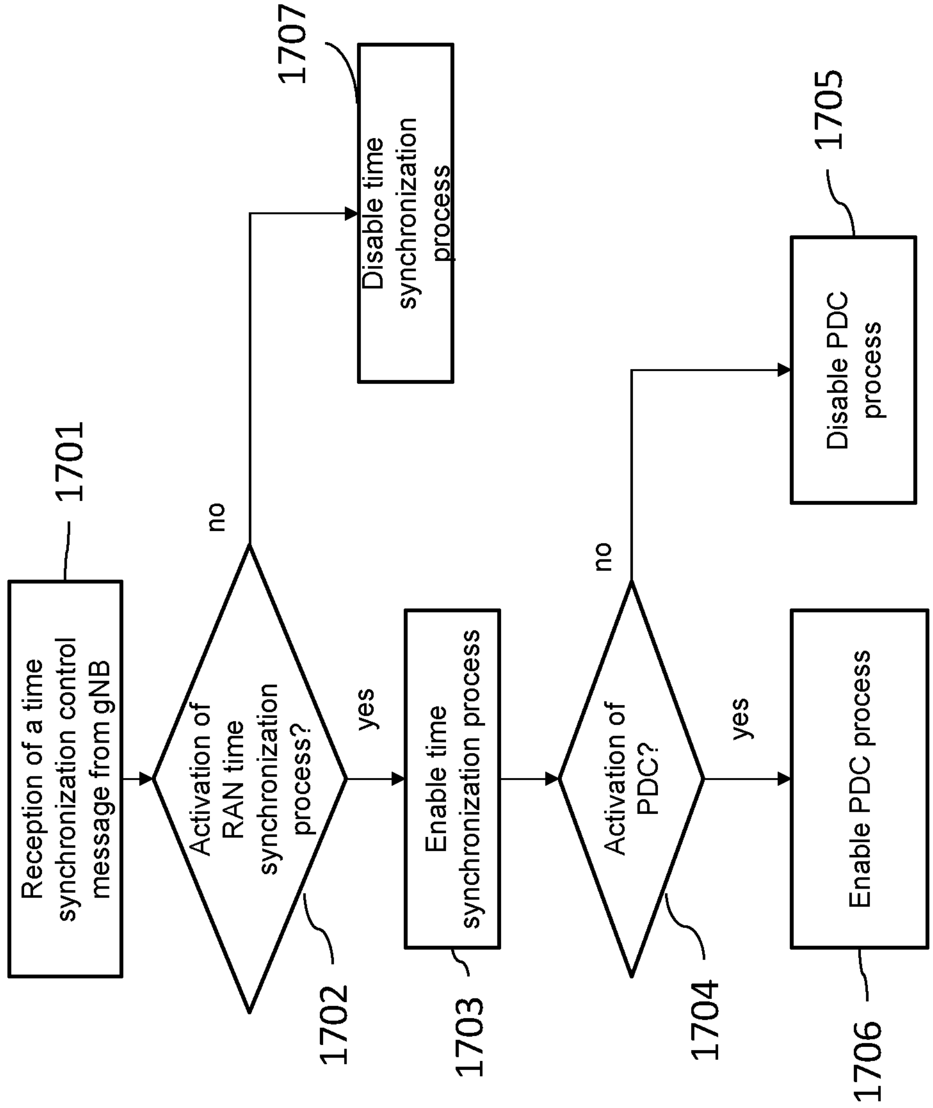
FIG. 8 illustrates a flow diagram of an example method performed by the UE in response to a time synchronization control message received from the gNB according to an embodiment.

FIG. 8 shows a flow diagram of an example method for controlling time synchronisation in a wireless network, according to an embodiment of the invention, which is performed by a UE 300.

First at step 1701, the UE 300 receives a time synchronization control message from an associated gNB 200. The time synchronization control message may be a MAC CE message as described above with reference to FIG. 11 or a RRC reconfiguration message described above.

As discussed above, the time synchronization control message may include at least a first field for indicating whether the time synchronization process is to be active or inactive and may include a second field for indicating whether the path delay compensation is to be active or inactive. The time synchronization control message generated by the gNB 200 may be based on a MAC CE described below with reference to FIG. 11. Such a MAC CE time synchronization control message includes a time synchronization field or flag (bit 8) and a path delay compensation field or flag (bit 7). Each field can be set to "ON" or "OFF". Then the UE 300 parses the time synchronization control message to check whether the first field (e.g. time synchronization field) is set to "ON". If the time synchronization field in the time synchronization control message is set to "ON" (yes branch at step 1702), then at step 1703, the UE 300 activates or enables the time synchronization process at the UE 300. Then the UE 300 checks, at step 1704, whether the second field of the time synchronization control message (e.g. path delay compensation field) is set to "ON". If the PDC field in the time synchronization control message is set to "ON" (yes branch at step 1704), then at step 1706, the UE 300 activates or enables the path delay compensation at the UE 300. If the PDC field in the time synchronization control message is set to "OFF" (no branch at step 1704), then at step 1706, the UE 300 deactivates or disables the path delay compensation at the UE 300.

Otherwise if the time synchronization field is set to "OFF" (no branch at step 1702), at step 1707, the UE 300 disables or deactivates the time synchronization process at the UE 300.

A solution to control the activation of UE side PDC and more generally to control the activation of the synchronization in RAN has been proposed. The proposal described above shows that this can be achieved without needing additional information from the core network such as the time synchronization error budget.

In order to ensure accurate time synchronisation for time sensitive communications (TSC), the time synchronisation process is based on the periodic transmission of the reference time from the gNBs to the UEs. In order to improve the accuracy of the time synchronisation process, path delay compensation (PDC) may also be performed which is based on the exchange between the UEs and gNBs of dedicated signals to estimate and convey a path delay value. Thus, the time synchronisation process and PDC requires radio resources and processing resources in the RAN of the 5G network.

In accordance with an aspect of the invention, signalling shall allow enabling and disabling the clock synchronization in the RAN (UEs and gNBs) only when needed.

The Study Item (SI) of NR IIoT has concluded that certain enhancements of RAN features in different layers should be specified for Rel-16 to support new use cases: Factory automation, Transport Industry, Electrical Power Distribution. This has led to new QoS parameters for delay critical application in the 5QI (TS23.501—Table 5.7.4-1). As discussed above, the smart grid scenario is similar to Electricity distribution and control-to-control is similar to discrete automation defined in the delay critical GBR 5QI.

The UE or the gNB may use the QoS parameters included in the PDU SESSION message to make a determination as to whether the PDU session has some specific requirement in term of time synchronization (i.e. it requires or needs time synchronization). The UE or the gNB may parse the QoS flow description information element included in the PDU SESSION message to check the 5QI parameter. If the 5QI value corresponds to a delay critical GBR (#82, #83, #84, #85), the UE or the gNB may determine there is a requirement or need for time synchronization (accurate reference time with or without PDC).

In accordance with an aspect of the invention, the need for time synchronization can be determined if a PDU session is accepted with GBR #82, or #83, or #84, or #85 QoS parameters.

In a context of Time Sensitive Network application, the 5G system is integrated in a TSN system as a TSN bridge. Some specific entity i.e. DS-TT (Device Side TSN Translator) and NW-TT (Network Side TSN Translator) are responsible for the translation between TSN domain and 5G domain. To configure the DS-TT, the 5G core uses the Port Management Information message, which is a control messages including information to configure the DS-TT and particularly the Precision Time Protocol which ensures the synchronization of the TSN application. One parameter of the configuration is the PTP profile (defined in IEEE Std 1588-2019 clause 20.3.3). Each PTP profile defines a set of parameters to support more or less stringent application in term of synchronization accuracy.

In accordance with an aspect of the invention, the need of PDC may be determined based on the PTP profile parameter supplied by PMIC message.

Once the UE has determined its need of time synchronization, it shall inform the gNB about its time synchronization requirement in order for the gNB to setup and activate the time synchronization i.e. to send the reference time information and optionally perform the PDC computation.

In accordance with an aspect of the invention, upon determination of the time synchronization need, the UE sends a signaling message (e.g. a time synchronization control message) to the gNB to start the RAN time synchronization.

While the present invention has been described with reference to embodiments and examples, it is to be understood that the invention is not limited to the disclosed embodiments and examples. It will be appreciated by those skilled in the art that various changes and modifications might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

In the preceding embodiments and examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The invention claimed is:

1. A method for controlling time synchronization in a wireless network comprising a user equipment, UE, and a base station, the method, at the base station, comprising:

receiving, from a core network entity of the wireless network, information associated with time synchronization between the UE and the base station;

in a case where Timing Advance, TA, has been selected as a type of propagation delay compensation, PDC, to be performed by the UE after receiving the information associated with the time synchronization, sending, to the UE, a time synchronization control message indicating TA; and in a case where Round Trip Time, RTT, has been selected as a type of PDC to be performed by the UE after receiving the information associated with the time synchronization, sending, to the UE, a time synchronization control message indicating RTT.

2. The method of claim 1, the method further comprising:

receiving a message from the core network entity of the wireless network, wherein the message includes the information associated with the time synchronization between the UE and the base station.

3. The method of claim 2, wherein the message is a synchronization notification including information elements for the information associated with the time synchronization between the UE and the base station, wherein the information elements include a first information element indicating an identity of the UE to be configured, a second information element indicating whether a time synchronization process is to be active or inactive, and a third information element indicating whether propagation delay compensation is to be active or inactive.

4. The method of claim 1, wherein the time synchronization control message includes information for activating or deactivating propagation delay compensation.

5. The method of claim 1, wherein the time synchronization control message is a MAC Control Element, MAC-CE, message or a RRC message.

6. The method of claim 1, wherein;

in the case where TA has been selected as the type of PDC, the time synchronization control message includes a field for indicating TA for a time synchronization process, and in the case where RTT has been selected as the type of PDC, the time synchronization control message includes a field for indicating RTT for a time synchronization process.

7. The method of claim 1, the method, at the base station, further comprising:

selecting any one of a plurality of types of PDC including TA and RTT to be performed by the UE.

8. The method of claim 1, the method, at the base station, further comprising:

selecting any one of a plurality of types of PDC including TA and RTT to be performed by the UE, based on the information associated with the time synchronization between the UE and the base station received from the core network entity.

9. A method for controlling time synchronization in a wireless network comprising a user equipment, UE, and a base station, the method, at the UE, comprising:

in a case where Timing Advance, TA, has been selected as a type of propagation delay compensation, PDC, to be performed by the UE, receiving, from the base station, a time synchronization control message indicating TA;

in a case where Round Trip Time, RTT, has been selected as a type of PDC to be performed by the UE, receiving, from the base station, a time synchronization control message indicating RTT; and after receiving the time synchronization control message, controlling a time synchronization process based on the type of PDC indicated by the received time synchronization control message.

10. The method of claim 9, wherein the time synchronization control message includes a field for indicating the type of propagation delay compensation for the time synchronization process.

11. An apparatus for a User Equipment, UE, for controlling time synchronization between the UE and a base station of a wireless network, the apparatus comprising:

one or more processing units configured to:

receive, from the base station, a first message indicating Timing Advance, TA, as a type of propagation delay compensation, PDC;

receive, from the base station, a second message indicating Round Trip Time, RTT, as a type of PDC; and after receiving the first message or the second message, control a time synchronization process based on the type of PDC indicated by the received first message or second message, wherein, in each of the first message and the second message, a type of PDC to be performed by the UE for the time the time synchronization process e is indicated as a type selected from among a plurality of types of PDC including TA and RTT.

12. The apparatus of claim 11, wherein at least one of the first message and the second message includes a field for indicating the selected type of propagation delay compensation for the time synchronization process.

13. An apparatus for a base station for controlling time synchronization between a User Equipment (UE) and the base station of a wireless network, the apparatus comprising:

one or more processing units configured to:

receive, from a core network entity of the wireless network, information associated with time synchronization between the UE and the base station; and send to the UE, a first message indicating Timing Advance, TA, as a type of propagation delay compensation, PDC, after receiving the information associated with the time synchronization; and send, to the UE, a second message indicating Round Trip Time, RTT, as a type of PDC, after receiving the information associated with the time synchronization, wherein the base station sends the first message or the second message in each of which a type of PDC to be performed by the UE for a time synchronization process is indicated as a type selected from among a plurality of types of PDC including TA and RTT.

14. The apparatus of claim 13, wherein the one or more processing units are further configured to:

receive a message from the core network entity of the wireless network, wherein the message includes the information associated with the time synchronization between the UE and the base station.

15. The apparatus of claim 14, wherein the message is a synchronization notification including information elements for the information associated with the time synchronization between the UE and the base station, wherein the information elements include a first information element indicating the identity of the UE to be configured, a second information element indicating whether the time synchronization process is to be active or inactive, and a third information element indicating whether propagation delay compensation is to be active or inactive.

16. The apparatus of claim 13, wherein at least one of the first message and the second message includes information for activating or deactivating propagation delay compensation.

17. The apparatus of claim 13, wherein at least one of the first message and the second message is a MAC Control Element, MAC-CE, message or a RRC message.

18. The apparatus of claim 13, wherein at least one of the first message and the second message includes a field for indicating the selected type of propagation delay compensation for the time synchronization process.

19. The apparatus of claim 13, wherein the one or more processing units are further configured to:

select, from among the plurality of types of PDC including TA and RTT, a type of PDC to be performed by the UE.

20. The apparatus of claim 13, wherein the one or more processing units are further configured to:

select, from among the plurality of types of PDC including TA and RTT, a type of PDC to be performed by the UE, based on the information associated with the time synchronization between the UE and the base station.

21. A non-transitory computer-readable storage medium storing a computer program comprising instructions which, when the program is executed by one or more processing units of a base station of a wireless network, cause the one or more processing units to:

receive, from a core network entity of the wireless network, information associated with time synchronization between the UE and the base station;

send, to the UE, a first message indicating Timing Advance, TA, as a type of propagation delay compensation, PDC, after receiving the information associated with the time synchronization; and send, to the UE, a second message indicating Round Trip Time, RTT, as a type of PDC, after receiving the information associated with the time synchronization, wherein the base station sends the first message or the second message in each of which a type of PDC to be performed by the UE for a time synchronization process is indicated as a type selected from among a plurality of types of PDC including TA and RTT.

22. A non-transitory computer-readable storage medium storing a computer program comprising instructions which, when the program is executed by one or more processing units of a User Equipment, UE, of a wireless network, cause the one or more processing units to:

receive, from a base station of the wireless network, a first message indicating Timing Advance, TA, as a type of propagation delay compensation, PDC;

receive, from the base station, a second message indicating Round Trip Time, RTT, as a type of PDC; and after receiving the first message or the second message, control a time synchronization process based on the type of PDC indicated by the received first message or second message, wherein, in each of the first message and the second message, a type of PDC to be performed by the UE for the time synchronization process is indicated as a type selected from among a plurality of types of PDC including TA and RTT.

* * * * *